(12) United States Patent
Rose et al.

(10) Patent No.: US 8,226,118 B2
(45) Date of Patent: Jul. 24, 2012

(54) SAFETY VENTING WITH PASSIVELY CLOSEABLE VENTS

(75) Inventors: Larry D. Rose, South Weber, UT (US); Jeffrey D. Williams, Roy, UT (US); John C. Newkirk, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 328 days.

(21) Appl. No.: 12/536,360

(22) Filed: Aug. 5, 2009

(65) Prior Publication Data
US 2011/0031725 A1 Feb. 10, 2011

(51) Int. Cl.
*B60R 21/2334* (2011.01)
*B60R 21/2338* (2011.01)
(52) U.S. Cl. .................................... 280/743.2
(58) Field of Classification Search ................ 280/743.2
See application file for complete search history.

(56) References Cited

U.S. PATENT DOCUMENTS

| | | |
|---|---|---|
| 3,748,477 A | 7/1973 | Wulbrecht |
| 4,235,453 A | 11/1980 | Lawson et al. |
| 4,286,954 A | 9/1981 | McArthur et al. |
| 4,351,544 A | 9/1982 | Ross |
| 4,842,300 A | 6/1989 | Ziomek et al. |
| 5,004,266 A | 4/1991 | Miller et al. |
| 5,016,913 A | 5/1991 | Nakajima et al. |
| 5,022,675 A | 6/1991 | Zelenak et al. |
| 5,140,799 A | 8/1992 | Satoh |
| 5,172,933 A | 12/1992 | Strasser |
| 5,178,407 A | 1/1993 | Kelley |
| 5,240,282 A | 8/1993 | Wehner et al. |
| 5,240,283 A | 8/1993 | Kishi et al. |
| 5,246,250 A | 9/1993 | Wolanin et al. |
| 5,280,953 A | 1/1994 | Wolanin et al. |
| 5,290,061 A | 3/1994 | Bollaert |
| 5,290,953 A | 3/1994 | Clark, Jr. et al. |
| 5,306,043 A | 4/1994 | Mihm et al. |
| 5,310,216 A | 5/1994 | Wehner et al. |
| 5,346,248 A | 9/1994 | Rhein et al. |
| 5,350,188 A | 9/1994 | Sato |
| 5,391,137 A | 2/1995 | DePoy et al. |
| 5,398,968 A | 3/1995 | Emambakhsh et al. |

(Continued)

FOREIGN PATENT DOCUMENTS
DE 196 40 322 3/1996
(Continued)

OTHER PUBLICATIONS

Supplementary European Search Report dated Nov. 7, 2007 in European patent application No. 05777506.6, now issued as European Patent No. 1,824,710.

(Continued)

*Primary Examiner* — Paul N Dickson
*Assistant Examiner* — Joselynn Y Sliteris
(74) *Attorney, Agent, or Firm* — Sally J. Brown; Stoel Rives LLP

(57) ABSTRACT

The airbag cushion has a passive venting system that remains open or transitions to a closed position depending on the impact of the airbag with an occupant and the position of the occupant. The venting system self closes upon deployment when an occupant is not out of position but remains open when an occupant is out of position. The venting system self closes due to cushion membrane tension.

7 Claims, 15 Drawing Sheets

U.S. PATENT DOCUMENTS

| | | | |
|---|---|---|---|
| 5,405,166 A | 4/1995 | Rogerson |
| 5,407,227 A | 4/1995 | Lauritzen et al. |
| 5,419,579 A | 5/1995 | McPherson et al. |
| 5,421,607 A | 6/1995 | Gordon |
| 5,425,551 A | 6/1995 | Hawthorn |
| 5,447,329 A | 9/1995 | Hamada |
| 5,452,913 A | 9/1995 | Hansen |
| 5,454,595 A | 10/1995 | Olson et al. |
| 5,492,363 A | 2/1996 | Hartmeyer et al. |
| 5,492,367 A | 2/1996 | Albright et al. |
| 5,494,314 A | 2/1996 | Kriska et al. |
| 5,496,056 A | 3/1996 | Dyer |
| 5,520,413 A | 5/1996 | Mossi et al. |
| 5,531,477 A | 7/1996 | Madrigal et al. |
| 5,538,281 A | 7/1996 | Patercsak |
| 5,570,905 A | 11/1996 | Dyer |
| 5,588,674 A | 12/1996 | Yoshimura et al. |
| 5,603,526 A | 2/1997 | Buchanan |
| 5,613,698 A | 3/1997 | Patercsak et al. |
| 5,630,614 A | 5/1997 | Conlee |
| 5,694,737 A | 12/1997 | Lunt et al. |
| 5,732,973 A | 3/1998 | Turnbull et al. |
| 5,755,459 A | 5/1998 | LaLonde |
| 5,765,867 A | 6/1998 | French |
| 5,772,239 A | 6/1998 | Seymour |
| 5,775,729 A | 7/1998 | Schneider et al. |
| 5,823,566 A | 10/1998 | Manire |
| 5,823,567 A | 10/1998 | Behr et al. |
| 5,899,495 A | 5/1999 | Yamamoto et al. |
| 5,931,497 A | 8/1999 | Fischer |
| 5,945,184 A | 8/1999 | Nagata et al. |
| 5,957,486 A | 9/1999 | Taguchi et al. |
| 5,979,937 A | 11/1999 | Yoshida et al. |
| 6,029,996 A | 2/2000 | Yoshioka et al. |
| 6,056,318 A | 5/2000 | Braunschadel |
| 6,095,557 A | 8/2000 | Takimoto et al. |
| 6,110,094 A | 8/2000 | Wallentin et al. |
| 6,126,196 A | 10/2000 | Zimmerman |
| 6,131,944 A | 10/2000 | Henkel et al. |
| 6,139,048 A | 10/2000 | Braunschadel |
| 6,142,517 A | 11/2000 | Nakamura et al. |
| 6,155,598 A | 12/2000 | Kutchey |
| 6,183,003 B1 | 2/2001 | Matsuhashi et al. |
| 6,186,544 B1 | 2/2001 | Igawa |
| 6,196,585 B1 | 3/2001 | Igawa |
| 6,203,062 B1 | 3/2001 | Kusaka et al. |
| 6,206,408 B1 | 3/2001 | Schneider |
| 6,247,726 B1 | 6/2001 | Ryan |
| 6,286,866 B1 | 9/2001 | Satge et al. |
| 6,290,257 B1 | 9/2001 | Bunce et al. |
| 6,299,202 B1 | 10/2001 | Okada et al. |
| 6,352,283 B1 | 3/2002 | Ellerbrok et al. |
| 6,371,509 B1 | 4/2002 | Ellerbrok et al. |
| 6,371,510 B1 | 4/2002 | Marriott et al. |
| 6,390,500 B1 | 5/2002 | Yamada et al. |
| 6,390,501 B1 | 5/2002 | Greib et al. |
| 6,398,258 B2 | 6/2002 | Hamada et al. |
| 6,419,267 B1 | 7/2002 | Hashimoto et al. |
| 6,432,033 B2 | 8/2002 | Salzmann et al. |
| 6,474,686 B1 | 11/2002 | Higuchi et al. |
| 6,499,765 B2 | 12/2002 | Hawthorn et al. |
| 6,554,313 B2 | 4/2003 | Uchida |
| 6,557,891 B2 | 5/2003 | Okada et al. |
| 6,619,691 B1 | 9/2003 | Igawa |
| 6,631,921 B1 | 10/2003 | Drossler et al. |
| 6,631,922 B2 | 10/2003 | Hess et al. |
| 6,648,371 B2 | 11/2003 | Vendely et al. |
| 6,669,229 B2 | 12/2003 | Thomas |
| 6,682,093 B2 | 1/2004 | Tajima et al. |
| 6,692,024 B2 | 2/2004 | Fischer et al. |
| 6,739,622 B2 | 5/2004 | Halford et al. |
| 6,746,045 B2 | 6/2004 | Short et al. |
| 6,767,030 B2 | 7/2004 | Yamaji et al. |
| 6,773,027 B2 | 8/2004 | Bohn et al. |
| 6,773,030 B2 | 8/2004 | Fischer |
| 6,784,379 B2 | 8/2004 | Breed et al. |
| 6,786,505 B2 | 9/2004 | Yoshida |
| 6,830,266 B2 | 12/2004 | Abe |
| 6,832,778 B2 | 12/2004 | Pinsenschaum et al. |
| 6,832,779 B2 | 12/2004 | Tajima et al. |
| 6,863,304 B2 | 3/2005 | Reiter et al. |
| 6,874,810 B2 | 4/2005 | Soderquist |
| 6,877,772 B2 | 4/2005 | Fischer et al. |
| 6,883,381 B2 | 4/2005 | Kolb et al. |
| 6,883,831 B2 | 4/2005 | Hawthorn et al. |
| 6,918,613 B2 | 7/2005 | Short et al. |
| 6,932,385 B2 | 8/2005 | Hawthorn et al. |
| 6,942,242 B2 | 9/2005 | Hawthorn et al. |
| 6,945,562 B2 | 9/2005 | Abe |
| 6,955,377 B2 | 10/2005 | Cooper et al. |
| 6,962,363 B2 | 11/2005 | Wang |
| 6,971,664 B2 | 12/2005 | Amamori |
| 6,971,671 B2 | 12/2005 | Schneider et al. |
| 6,988,743 B2 | 1/2006 | Okamoto et al. |
| 7,059,634 B2 | 6/2006 | Bossecker et al. |
| 7,066,487 B2 | 6/2006 | Sullivan |
| 7,083,191 B2 | 8/2006 | Fischer |
| 7,083,192 B2 | 8/2006 | Fischer et al. |
| 7,150,470 B2 | 12/2006 | Okada et al. |
| 7,195,281 B2 | 3/2007 | Williams et al. |
| 7,210,702 B2 | 5/2007 | Soderquist |
| 7,223,224 B2 | 5/2007 | Card et al. |
| 7,232,153 B2 | 6/2007 | Kawauchimaru et al. |
| 7,237,802 B2 | 7/2007 | Rose et al. |
| 7,261,319 B2 | 8/2007 | DePottey et al. |
| 7,293,795 B2 | 11/2007 | Kong |
| 7,328,915 B2 | 2/2008 | Smith et al. |
| 7,347,450 B2 | 3/2008 | Williams et al. |
| 7,360,789 B2 | 4/2008 | Bito |
| 7,364,192 B2 | 4/2008 | Braun et al. |
| 7,377,548 B2 | 5/2008 | Bauer et al. |
| 7,404,570 B2 | 7/2008 | Miyata |
| 7,413,218 B2 | 8/2008 | Ekdahl |
| 7,441,804 B2 | 10/2008 | Rose et al. |
| 7,441,805 B2 | 10/2008 | Jamison et al. |
| 7,445,239 B2 | 11/2008 | Okada et al. |
| 7,481,455 B2 | 1/2009 | Iida et al. |
| 7,530,597 B2 | 5/2009 | Bito |
| 7,556,290 B2 | 7/2009 | Williams et al. |
| 7,568,729 B2 | 8/2009 | Schnieder et al. |
| 7,597,355 B2 | 10/2009 | Williams et al. |
| 7,597,356 B2 | 10/2009 | Williams |
| 7,604,252 B2 | 10/2009 | Heitplatz et al. |
| 7,607,689 B2 | 10/2009 | Kalczynski et al. |
| 7,607,690 B2 * | 10/2009 | Abe et al. ............... 280/739 |
| 7,614,653 B2 | 11/2009 | Rose et al. |
| 7,614,654 B2 | 11/2009 | Williams |
| 7,651,130 B2 * | 1/2010 | Bauberger ............ 280/743.2 |
| 7,654,561 B2 | 2/2010 | Webber et al. |
| 7,673,899 B2 | 3/2010 | Abe |
| 7,722,080 B2 | 5/2010 | Rose |
| 7,726,685 B2 * | 6/2010 | Abe et al. ............... 280/736 |
| 7,735,862 B2 | 6/2010 | Choi |
| 7,748,738 B2 | 7/2010 | Schneider |
| 7,762,576 B2 | 7/2010 | Cho |
| 7,770,925 B2 * | 8/2010 | Seymour et al. ........ 280/743.1 |
| 7,770,926 B2 | 8/2010 | Schneider |
| 7,784,828 B2 | 8/2010 | Mills et al. |
| 7,845,682 B2 | 12/2010 | Lachat et al. |
| 7,857,347 B2 * | 12/2010 | Abe et al. ............... 280/743.2 |
| 7,878,538 B2 * | 2/2011 | Abe et al. ............... 280/739 |
| 7,926,844 B2 | 4/2011 | Williams |
| 7,931,297 B2 * | 4/2011 | Abe et al. ............... 280/739 |
| 7,938,444 B2 * | 5/2011 | Williams et al. ........ 280/743.2 |
| 7,938,445 B2 | 5/2011 | Smith et al. |
| 7,942,442 B2 | 5/2011 | Rose et al. |
| 7,946,613 B2 | 5/2011 | Rose et al. |
| 7,959,184 B2 * | 6/2011 | Fukawatase et al. ....... 280/739 |
| 8,070,183 B2 * | 12/2011 | Kumagai et al. ........ 280/743.2 |
| 2002/0020990 A1 | 2/2002 | Sinnhuber et al. |
| 2002/0117840 A1 | 8/2002 | Dunkle et al. |
| 2003/0001366 A1 | 1/2003 | Debler et al. |
| 2003/0020266 A1 | 1/2003 | Vendely et al. |
| 2003/0020268 A1 | 1/2003 | Reiter et al. |
| 2003/0030254 A1 | 2/2003 | Hasebe |
| 2003/0057691 A1 | 3/2003 | Tokita et al. |
| 2003/0127839 A1 | 7/2003 | Jenkins |

| | | |
|---|---|---|
| 2003/0189319 A1 | 10/2003 | Soderquist |
| 2003/0209895 A1 | 11/2003 | Gu |
| 2003/0214125 A1 | 11/2003 | Schneider et al. |
| 2003/0234520 A1 | 12/2003 | Hawthorn et al. |
| 2004/0012179 A1 | 1/2004 | Pinsenschaum et al. |
| 2004/0056459 A1 | 3/2004 | Kassman et al. |
| 2004/0090054 A1 | 5/2004 | Bossecker et al. |
| 2004/0130135 A1 | 7/2004 | Ekdahl |
| 2004/0188990 A1 | 9/2004 | Short et al. |
| 2004/0251669 A1 | 12/2004 | Fischer et al. |
| 2004/0256842 A1 | 12/2004 | Breed et al. |
| 2005/0040634 A1 | 2/2005 | Braun et al. |
| 2005/0052008 A1 | 3/2005 | Rose et al. |
| 2005/0057027 A1 | 3/2005 | Fogle et al. |
| 2005/0098990 A1 | 5/2005 | Pinsenschaum et al. |
| 2005/0134032 A1 | 6/2005 | Downing et al. |
| 2005/0236822 A1 | 10/2005 | Rose et al. |
| 2005/0248137 A1 | 11/2005 | Delventhal et al. |
| 2006/0001244 A1 | 1/2006 | Taguchi et al. |
| 2006/0012157 A1 | 1/2006 | Ishiguro et al. |
| 2006/0071461 A1 | 4/2006 | Williams et al. |
| 2006/0071462 A1 | 4/2006 | Smith et al. |
| 2006/0131847 A1 | 6/2006 | Sato et al. |
| 2006/0151979 A1 | 7/2006 | DePottey et al. |
| 2006/0197327 A1 | 9/2006 | Maripudi et al. |
| 2006/0202454 A1 | 9/2006 | Parizal et al. |
| 2006/0244248 A1 | 11/2006 | Rose et al. |
| 2006/0284404 A1 | 12/2006 | Green et al. |
| 2007/0045997 A1 | 3/2007 | Abe et al. |
| 2007/0052221 A1 | 3/2007 | Okada et al. |
| 2007/0052222 A1 | 3/2007 | Higuchi et al. |
| 2007/0057487 A1 | 3/2007 | Kim |
| 2007/0108750 A1 | 5/2007 | Bauer et al. |
| 2007/0120346 A1 | 5/2007 | Kwon |
| 2007/0126218 A1 | 6/2007 | Schneider et al. |
| 2007/0126219 A1 | 6/2007 | Williams |
| 2007/0132222 A1 | 6/2007 | Thomas et al. |
| 2007/0138779 A1 | 6/2007 | Kwon |
| 2007/0170710 A1 | 7/2007 | Bouquier |
| 2007/0205590 A1 | 9/2007 | Klinkenberger et al. |
| 2007/0216146 A1 | 9/2007 | Williams |
| 2007/0278772 A1 | 12/2007 | Burghardt et al. |
| 2008/0007038 A1 | 1/2008 | Fischer et al. |
| 2008/0018086 A1 | 1/2008 | Ford et al. |
| 2008/0023950 A1 | 1/2008 | Kalczynski et al. |
| 2008/0023959 A1 | 1/2008 | Crawford |
| 2008/0073890 A1 | 3/2008 | Williams et al. |
| 2008/0073891 A1 | 3/2008 | Rose et al. |
| 2008/0073892 A1 | 3/2008 | Rose et al. |
| 2008/0073893 A1 | 3/2008 | Schneider |
| 2008/0079250 A1 | 4/2008 | Boyle et al. |
| 2008/0203713 A1 | 8/2008 | McFadden et al. |
| 2008/0217887 A1 | 9/2008 | Seymour et al. |
| 2008/0217892 A1 | 9/2008 | Maripudi |
| 2008/0284140 A1 | 11/2008 | Choi |
| 2008/0303256 A1 | 12/2008 | Williams |
| 2009/0033081 A1 | 2/2009 | Flischer et al. |
| 2009/0039630 A1 | 2/2009 | Schneider et al. |
| 2009/0102173 A1 | 4/2009 | Rose et al. |
| 2009/0108574 A1 | 4/2009 | Lachat et al. |
| 2009/0152842 A1 | 6/2009 | Benny et al. |
| 2009/0230663 A1 | 9/2009 | Mills et al. |
| 2009/0256338 A1 | 10/2009 | Williams |
| 2009/0256340 A1 | 10/2009 | Williams et al. |
| 2010/0019476 A1 | 1/2010 | Pausch |
| 2010/0032931 A1 | 2/2010 | Kumagai et al. |
| 2010/0102542 A1 | 4/2010 | Nakajima et al. |
| 2010/0225094 A1 | 9/2010 | Rose et al. |
| 2010/0225095 A1 | 9/2010 | Smith et al. |
| 2011/0031725 A1 | 2/2011 | Rose et al. |
| 2011/0088356 A1 | 4/2011 | Lachat et al. |

FOREIGN PATENT DOCUMENTS

| | | |
|---|---|---|
| DE | 10059956 | 6/2002 |
| EP | 0 458 838 | 5/1996 |
| EP | 1398228 | 3/2004 |
| EP | 1824710 | 6/2009 |
| EP | 1960240 | 8/2011 |
| GB | 2328646 | 3/1999 |
| JP | 03-281460 | 12/1991 |
| JP | 05085295 | 4/1993 |
| JP | 06255437 A | 9/1994 |
| JP | 08268213 | 10/1996 |
| JP | 2001-158315 | 6/2001 |
| JP | 2003-137060 | 4/2003 |
| JP | 2004-262432 | 9/2004 |
| JP | 2005 343267 | 12/2005 |
| WO | WO-2004/045919 | 6/2004 |
| WO | WO 2006/041547 | 4/2006 |
| WO | WO 2006/041552 | 4/2006 |
| WO | WO 2006/073534 | 7/2006 |
| WO | WO 2007/067371 | 6/2007 |
| WO | WO 2007/067377 | 6/2007 |
| WO | WO 2008/109202 | 9/2008 |
| WO | WO 2008/150578 | 12/2008 |
| WO | WO 2009/020786 | 8/2009 |
| WO | WO-2010/101673 | 9/2010 |

OTHER PUBLICATIONS

Extended European Search Report dated May 4, 2010 in corresponding European patent application No. 06838372.8, now issued as European Patent No. 1,960,240.

* cited by examiner

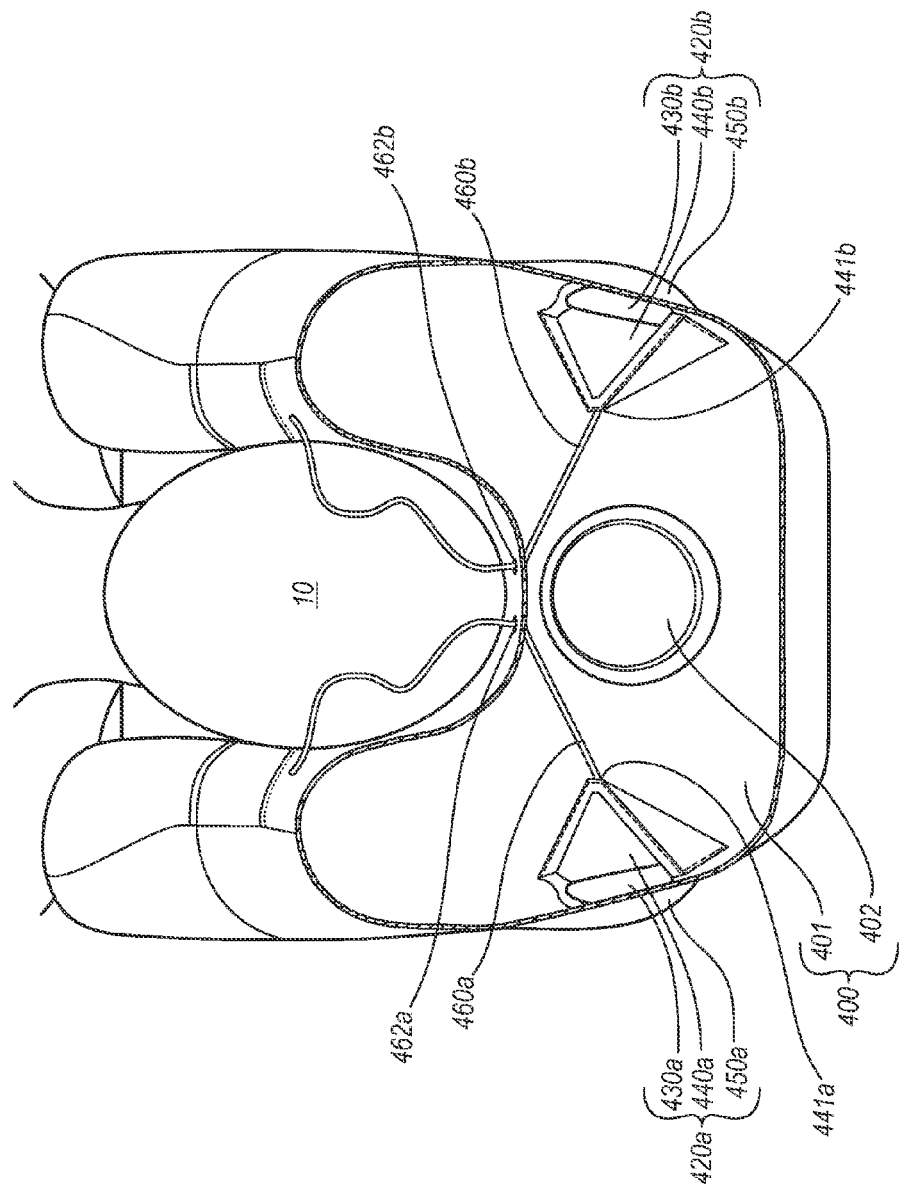

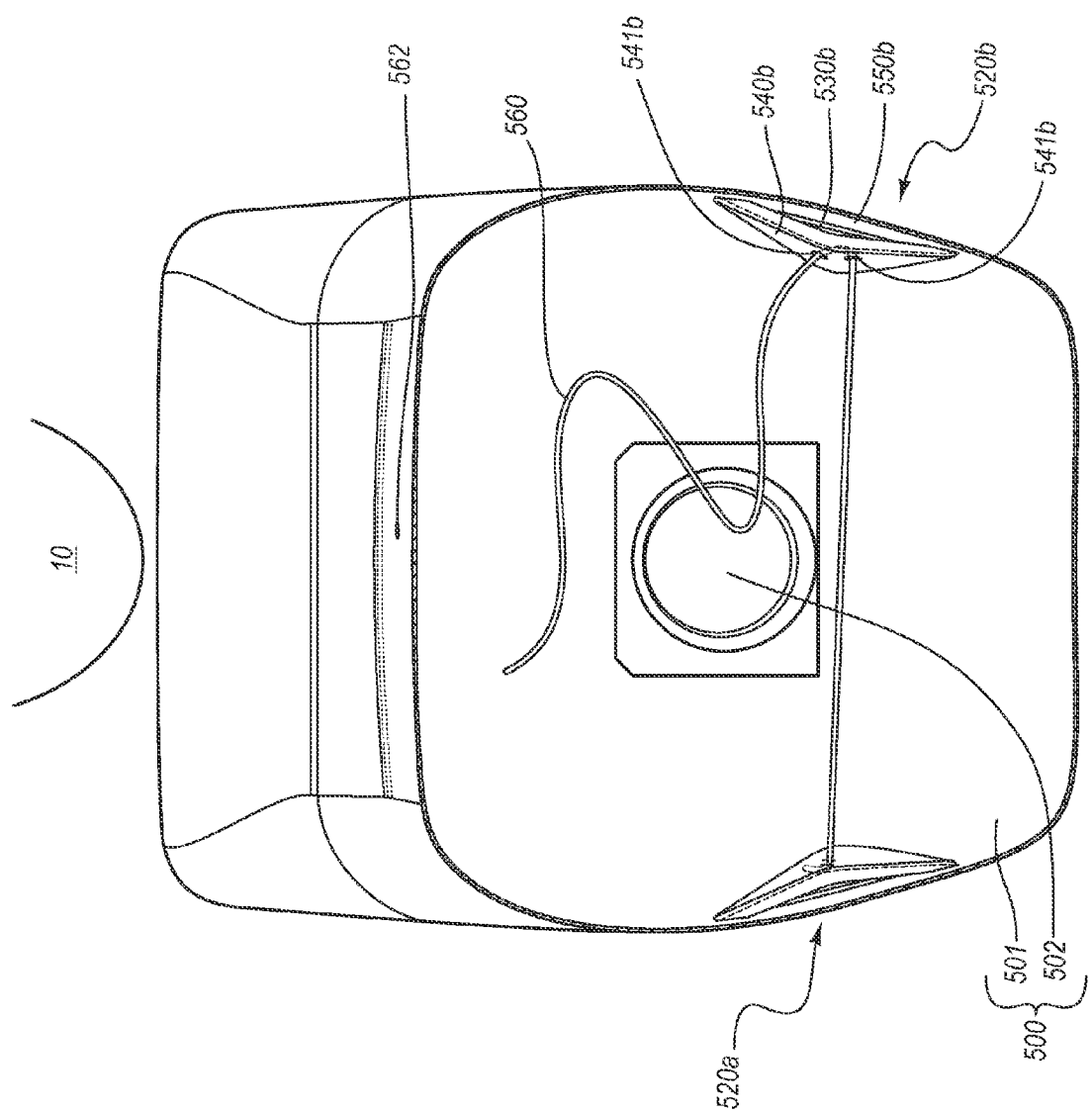

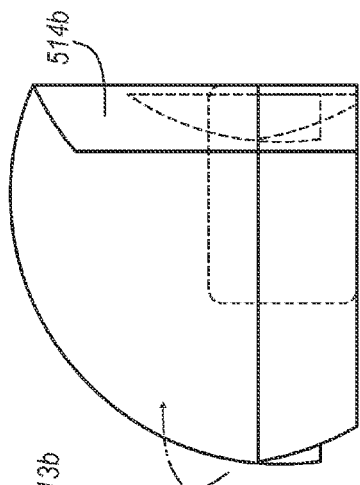
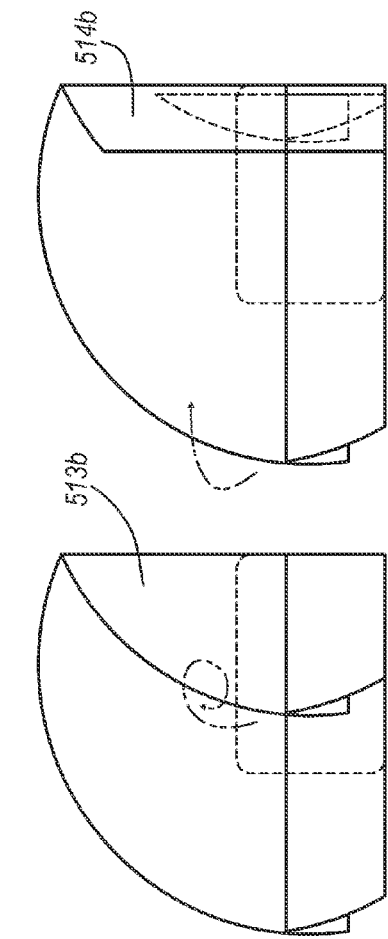
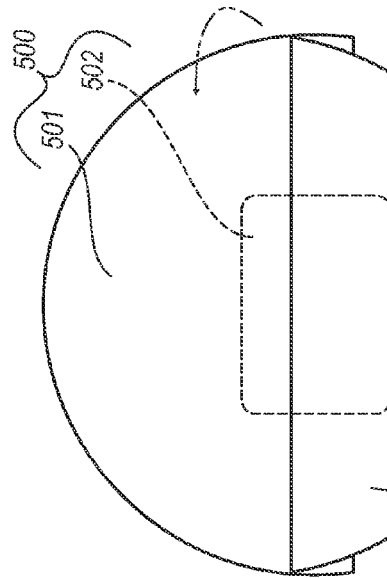
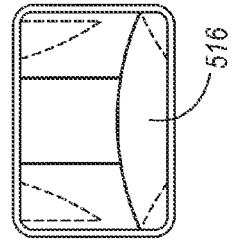
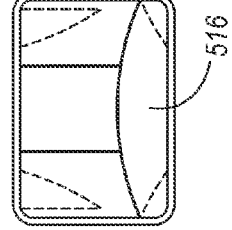
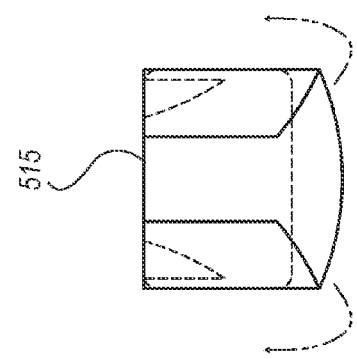
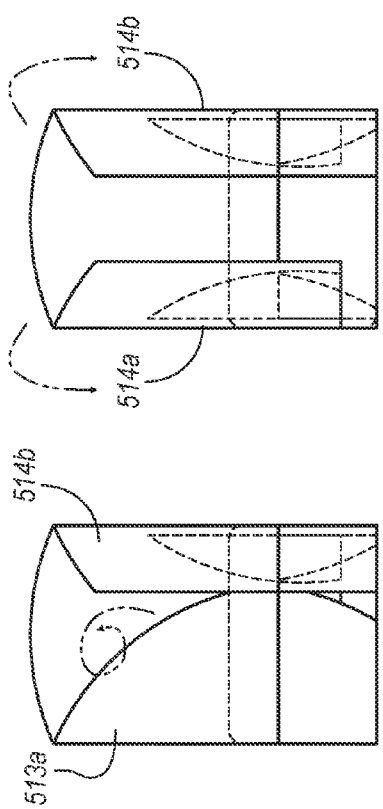

US 8,226,118 B2

SAFETY VENTING WITH PASSIVELY CLOSEABLE VENTS

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 4B depicts the airbag cushion deployed with an occupant that is not out-of-position.

FIG. 5B is a partial cut-away of the airbag cushion that provides a perspective view of the interior of the airbag cushion.

FIG. 6A is a partial cut-away of an airbag cushion that depicts the airbag cushion deployed with an out-of-position occupant adjacent thereto and provides a perspective view of the interior of the airbag cushion. This embodiment has two cords that extend through two respective holes in the cushion membrane such that a segment of each cord extends out of the cushion membrane and are coupled at the other ends to the vent covers of each vent and is attached at its opposing ends to a side panel of each vent.

FIG. 6B is a partial cut-away of the airbag cushion that provides a perspective view of the interior of the airbag cushion.

FIG. 7B depicts the embodiment shown in FIG. 7A with the airbag cushion deployed with an occupant that is not out-of-position. FIG. 7B is a partial cut-away of the airbag cushion that provides a perspective view of the interior of the airbag cushion.

FIG. 8D is a top plan view of the airbag cushion after the transition from the step shown in FIG. 8B with the rolled portion shown in FIG. 8C.

FIG. 8E is a top plan view of the airbag cushion shown in FIGS. 8A-8D after the right side of the airbag cushion has been folded.

FIG. 8F is a top plan view of the airbag cushion shown in FIGS. 8A-8E after the right side of the airbag cushion has been folded again.

FIG. 8G is a top plan view of the airbag cushion shown in FIGS. 8A-8F after the left side of the airbag cushion has been folded like the right side in FIG. 8E.

FIG. 8H is a top plan view of the airbag cushion shown in FIGS. 8A-8G after the left side of the airbag cushion has been folded again to be symmetrical with the right side.

FIG. 8I is a top plan view of the airbag cushion shown in FIGS. 8A-8H after the folded portions on the right and left sides have been further folded.

FIG. 8J is a top plan view of the airbag cushion shown in FIGS. 8A-8I after the overhanging portion is folded to fit into a housing with the inflator.

DETAILED DESCRIPTION OF PREFERRED EMBODIMENTS

The invention described hereinafter relates to inflatable airbags and more specifically to a venting system used to vary the deployment force when there is an out of position ("OOP") occupant in a vehicle. Each venting system described hereinafter comprises a cushion vent. The cushion vent comprises a vent opening formed in an airbag and a vent cover that covers the vent opening. The vent is configured such that the occupant's position adjacent to the airbag cushion body at the time of deployment allows the vent to self select its position to either remain open or transition to a closed position. At breakout, the vent is initially open so that inflation gas can be vented. If an OOP occupant is encountered then the impact against the occupant prevents the airbag from fully expanding and the vent remains open. If deployment of the airbag is unobstructed by an OOP occupant then the body of the airbag expands sufficiently to have a certain membrane force that causes the vent cover to tautly cover the vent opening. This configuration permits the vent to be self sealing for dynamic in-position load situations. In addition to the mechanism of fabric tension as driven by bag pressure, other factors that contribute to the ability of the vent to close include the geometry and orientation of the vent cover. Some embodiments have a tether that assists with maintaining the vent cover in a desired position while other embodiments are not tethered.

Figure 1B:
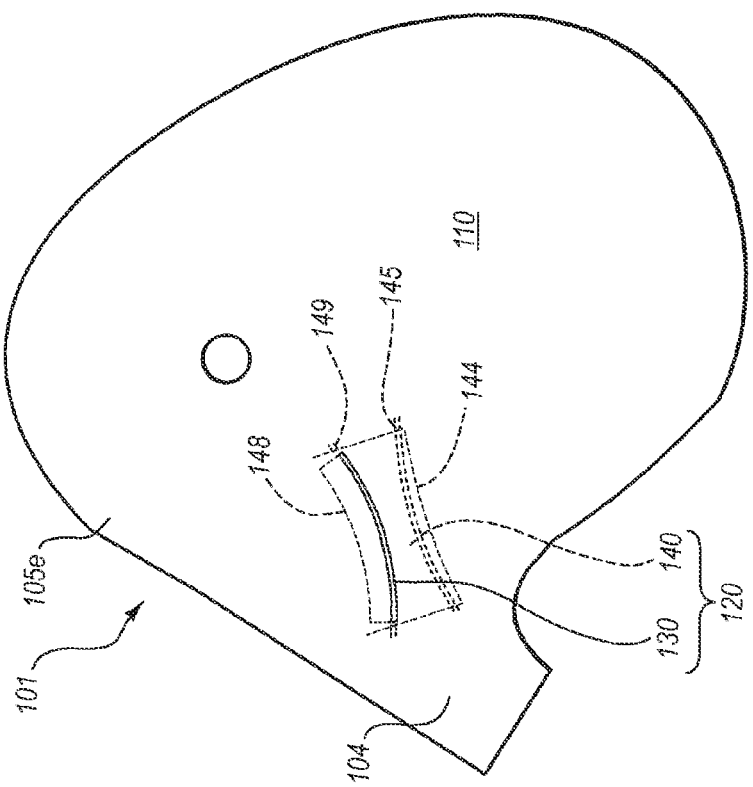
FIG. 1B is a side view of the outside of the airbag cushion shown in FIG. 1A showing the vent opening and the vent cover in shown in phantom since it is attached on the inside to the cushion membrane.
Figure 1A:
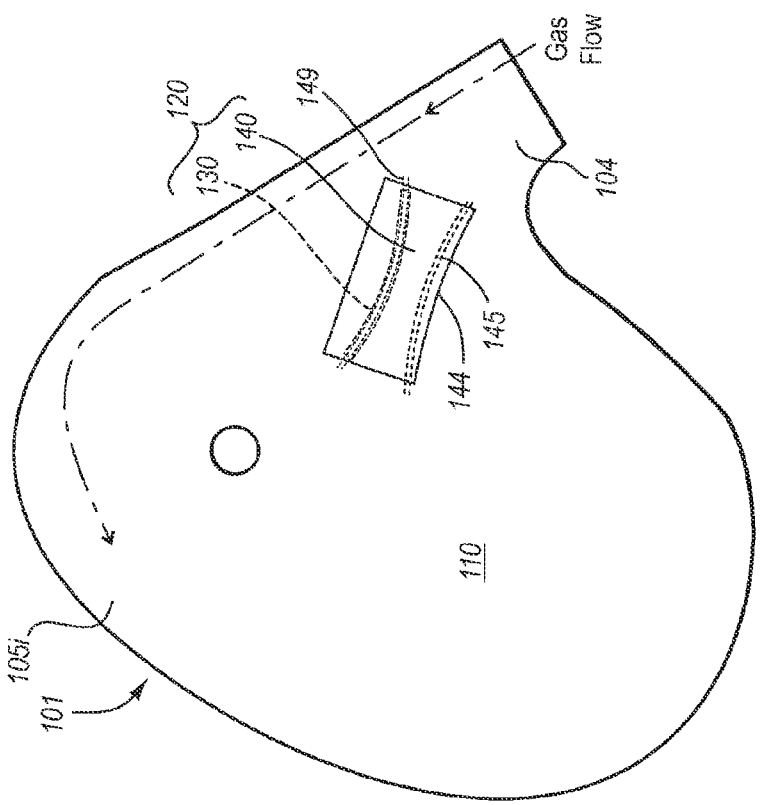
FIG. 1A is a side view of the inside of an airbag cushion that has fully expanded following deployment of the unobstructed airbag. The vent opening is covered by the vent cover.

With reference now to the accompanying figures, FIGS. 1A-1B depict an airbag cushion 101 that has been fully inflated. FIG. 1A shows the interior surface 105$i$ of membrane 105 of airbag cushion 101. FIG. 1B shows the exterior surface 105$e$ of cushion membrane 105. In the embodiment depicted in FIGS. 1A-1B, cushion vent 120 is initially open and passively self closes.

Cushion vent 120 has a cushion vent opening 130 that is cut or otherwise formed in membrane 105 of airbag cushion 100. Although cushion vent opening 130 is shown in the accompanying figures as a slit, the cushion vent opening may have other shapes and may have varying lengths. Virtually any shape of vent, and any shape of associated vent cover—including round, triangular, polygonal, etc.—may be suitable. In the depicted embodiment, cushion vent opening 130 is a slit. A vent cover 140 is attached to the airbag cushion body 110 in the vicinity of cushion vent opening 130, as depicted in FIGS. 1A-1B. It should be appreciated that, whereas the vent cover 130, in these figures, is attached to the interior surface 105$i$ of cushion membrane 105, it may be attached to the exterior surface 105$e$ of airbag cushion membrane 105 in other embodiments.

Figure 2A:
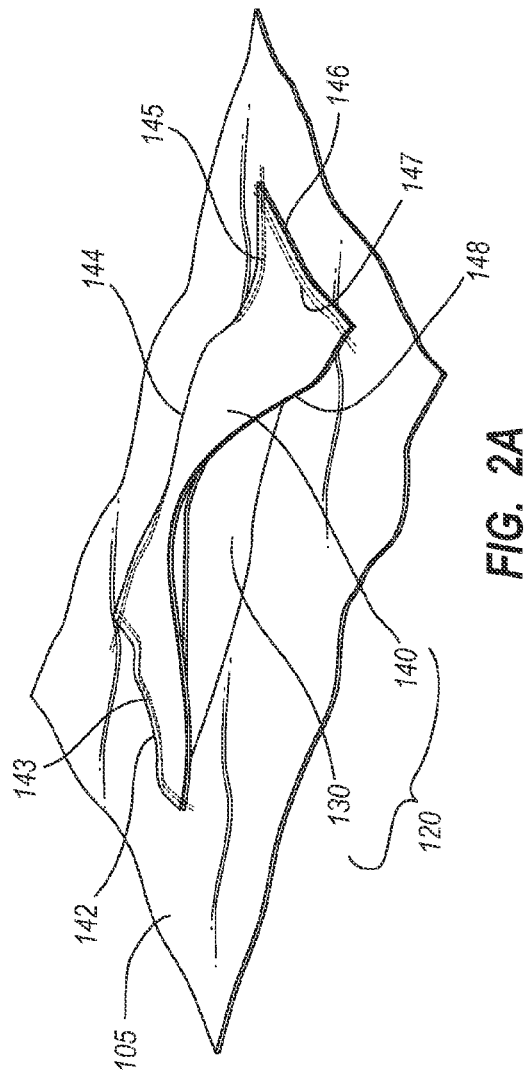
FIG. 2A is an enlarged perspective view of a portion of the inside of an airbag cushion with a vent cover distended away from a vent opening.
Figure 2B:
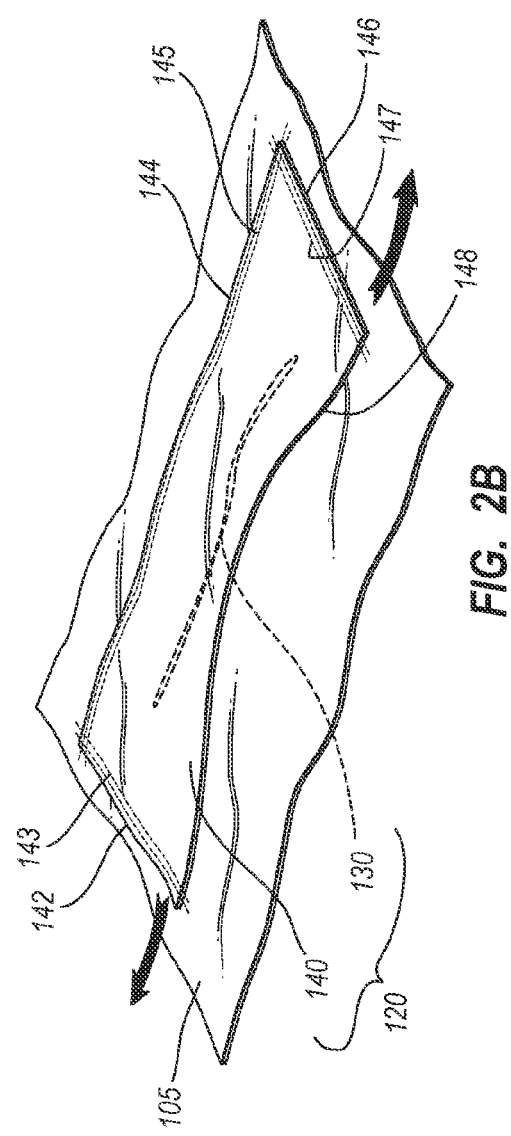
FIG. 2B is an enlarged perspective view of the embodiment shown in FIG. 2A following deployment of the unobstructed airbag with a vent opening covered by a vent cover.

In an embodiment featuring a rectangular-shaped vent cover as depicted in FIGS. 1A-2B, three sides of vent cover 140-marked as sides 142, 144, and 146 in FIGS. 2A-2B-may be sewn or otherwise attached to the airbag cushion. The fourth side, shown at 148, remains unattached so as to allow that side to be gathered or otherwise held away from the cushion vent opening 130. Of course, many variations are possible. For instance, a portion or portions of side 148 may be attached to the airbag cushion on either side of the cushion vent so as to leave only a portion of side 148 unattached, the side opposite from side 148, side 144, may remain unattached, or the vent cover may be attached at intervals as opposed to along an entire vent cover side. As long as the essential functional features of the invention are present, any number of alternative structures may be used.

As shown in FIGS. 1A-1B, vent opening 130 may have a slit-shape with a curvature that is concavely bowed downward toward side 144. The stitches used to attach the sides of vent cover 140, identified in FIGS. 1A-2B as stitches 143, 145, 147 and 149, may also have varying configurations. Stitches 143 and 147 are generally straight and parallel with respect to each other. Stitches 145 have a curvature that is convexly bowed upward toward side 148 but may also be straight in other embodiments. The curvature of stitches 145 assists with closing the vent by orienting vent cover 140 into a closed position. In the depicted embodiment, stitches 149 are not used to attach side 148 as they do not pass through membrane 105 along the length of side 148. Stitches 149 increase the edge stiffness and weight so that it is easier to seal the fabric of cover 140 over opening 130. Stitches 149 have a curvature that is concavely bowed downward toward side 144 but may also be straight. Note that stitches 149 extend beyond cover 140 into membrane 105. The concave configuration of stitches 149 and stitching beyond cover 140 assist in keeping cover 140 initially bowed out so that gas can escape through vent 120.

As indicated above, cover 140 is shown attached to an interior surface 105$i$ of membrane 105 but the cover could also be attached to exterior surface 105$e$. Also, the vent opening and the vent cover can be anywhere on the opposing side panels of the airbag with any suitable orientation or at other locations such as the top or bottom of the airbag cushion.

Figure 3C:
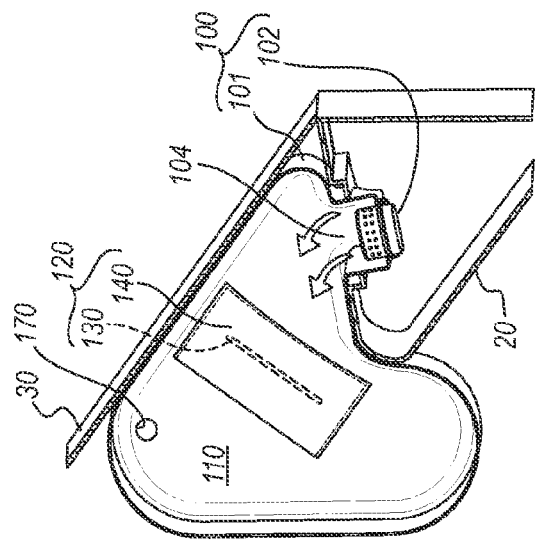
FIGS. 3A-3C provides cross-sectional, perspective views that depict an airbag incorporating the embodiment of FIGS. 2A-2C during unobstructed deployment of an airbag cushion without an out-of-position occupant adjacent thereto.
Figure 3B:
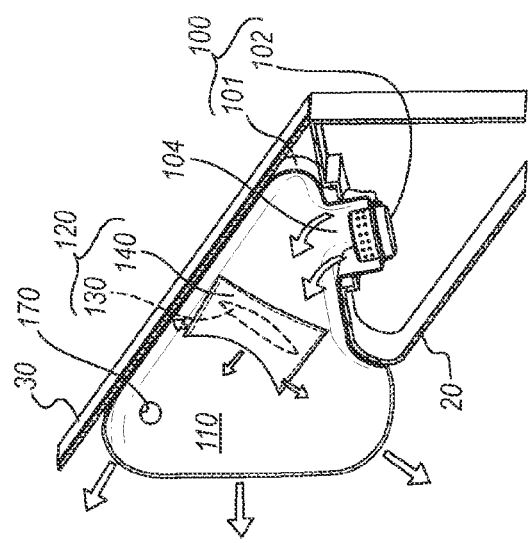
Figure 3A:
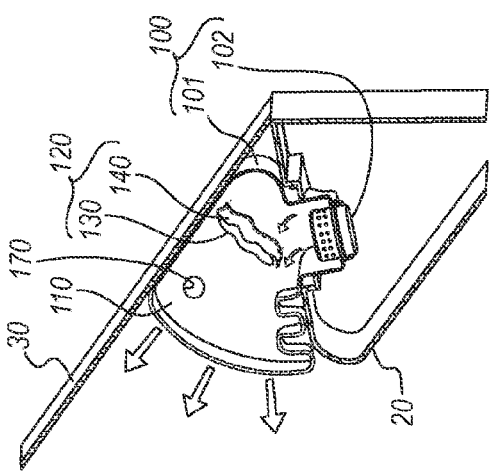

FIGS. 3A-3C depict the inflation or deployment of an airbag module incorporating an embodiment that is similar to the embodiment depicted in FIGS. 1A-2B. The orientation of the vent cover and the vent opening with respect to the flow of gas in the airbag body is a design variable as shown by these embodiments. In the embodiment shown in FIGS. 1A-1B, vent opening 130 and vent cover 140 are oriented generally downstream of the gas flow just beyond throat portion 104 at an angle that is less than 90° with respect to the flow of gas out of throat portion 104. More particularly, the orientation of vent opening 130 and vent cover 140 in the embodiment depicted in FIGS. 1A-1B is in a range of about 30° to about 60° such as about 45°. The embodiment depicted in FIGS. 3A-3C, in contrast, has vent opening 130 and vent cover 140 oriented at about 90° with respect to the flow of gas out of throat portion 104 or with respect to the windshield.

Airbag module 100 depicted in FIGS. 3A-3C is positioned in the car's dashboard 20 and deploys against the dashboard 20 and the windshield 10. The sequence shown in FIGS. 3A-3C is intended to depict deployment of an unobstructed airbag. In other words, the occupant is either in his or her proper position in the vehicle away from the airbag deployment location or there is no occupant in the seat adjacent to the airbag system at all. The airbag module depicted at 100 comprises an airbag cushion 101 and an inflator 102. Airbag cushion 101 has body 110, cushion vent 120, which includes vent opening 130 and vent cover 140, and a secondary vent 170.

The vent openings and vent covers can be designed to optimize the amount of inflation gas that is vented. For example, a large vent opening provides for rapid dumping of a large volume of gas compared with a smaller vent opening. It is contemplated that systems constructed in accordance with the principles of the present invention can include any number of cushion vents. A single cushion vent, two cushion vents—on opposing sides of the airbag body, for instance—or any other number of cushion vents may be used as desired. The cushion vent(s) may be positioned at any suitable location on the airbag body such as the top or bottom of the airbag body. Also, the cushion vent(s) could be positioned in the throat portion, such as a constricted throat portion like throat portion 104 in the accompany figures. The vents disclosed herein can also function with a loop diffuser to more rapidly direct inflation gas to the cushion vents.

The systems shown in the accompanying drawings also comprise one or more smaller or standard cushion openings, referred to herein as secondary vent openings 170, which typically do not include a vent cover and are therefore always open. Such secondary vent openings are, of course, optional, and typically have a smaller cross-sectional area than the cushion vent openings that are adapted to be covered with a vent cover in accordance with the principles of the invention.

Prior to deployment, the system may be housed in the vehicle's dashboard, instrument panel, steering wheel, or other such location. In the depicted embodiment, the system is housed in the dashboard 20 and as such is positioned partially against the car's windshield 30 when deployed.

FIG. 3A depicts the airbag system in the immediate milliseconds following deployment. The inflation gas or other fluid (represented by the arrows inside the bag) is causing the airbag body 110 to expand in the direction of the arrows just outside of the airbag on the figure. It should be noted that, at this early stage during deployment, the system can be configured such that inflation gas loss through the one or more cushion vents is minimal. In such embodiments, the cushion vent(s) may be positioned laterally with respect to the inflation gas flow as opposed to directly in the stream of the gas flow. When the cushion vent(s) are so positioned, the high velocity stream of gas creates a pressure imbalance (Bernoulli effect) which tends to prevent substantial amounts of inflation gas from exiting the airbag. Note that the embodiment depicted in FIGS. 3A-3C has an optional fixed vent 170.

At the point in time depicted in FIG. 3B, airbag body 110 has expanded sufficiently to allow the tension in the material of the airbag body, more particularly, the tension of the cushion membrane (represented by the arrows next to vent cover 140) has significantly increased, thereby allowing vent cover 140 to be tautly pressed against vent opening 130. Vent cover 140 in FIG. 3B is therefore in the process of covering vent opening 130 to prevent or at least impede the escape of inflation gas therethrough.

In FIG. 3C, vent cover 140 has covered vent opening 130 and airbag body 110 is shown fully inflated. Also, vent opening 130 has been pulled to a closed position. In this manner, the inflation gas is impeded from exiting airbag body 110.

The embodiments of the vent covers shown in FIGS. 1A-1B, FIGS. 2A-2B, and FIGS. 3A-3C are initially distended away from the vent opening and move without interaction with other structures that provides initial restraint that is overcome by the cushion membrane tension. This configuration enhances the ability to quickly responding so that they can easily self close. These embodiments also freely move without a track that guides movement for alignment and non-alignment of holes.

Other embodiments of airbag modules are shown at 200, 300, 400 and 500 respectively in FIGS. 4A-4B, FIGS. 5A-5B, FIGS. 6A-6B and FIGS. 7A-7D. FIGS. 4A, 5A, 6A, 7A and 7C depict deployment of the airbag module with an adjacent out-of-position occupant who is positioned too close to the airbag cushion at the time of deployment. FIGS. 4B, 5B, 6B, 7B and 7D depict deployment of the respective airbag modules when the adjacent occupant is either missing or in his or her proper position in the car seat. Note that identical or similar elements have the same numeral as increased in a series by one hundred. Note also that components featured as part of one embodiment can be combined with components of another embodiment. For example, the configuration of the vent covers and vent openings in the embodiments shown in FIGS. 1A-1B, FIGS. 2A-2B, and FIGS. 3A-3C can replace the vent covers and vent openings shown in FIGS. 4A-4B, FIGS. 5A-5B, FIGS. 6A-6B and FIGS. 7A-7D.

Figure 4A:
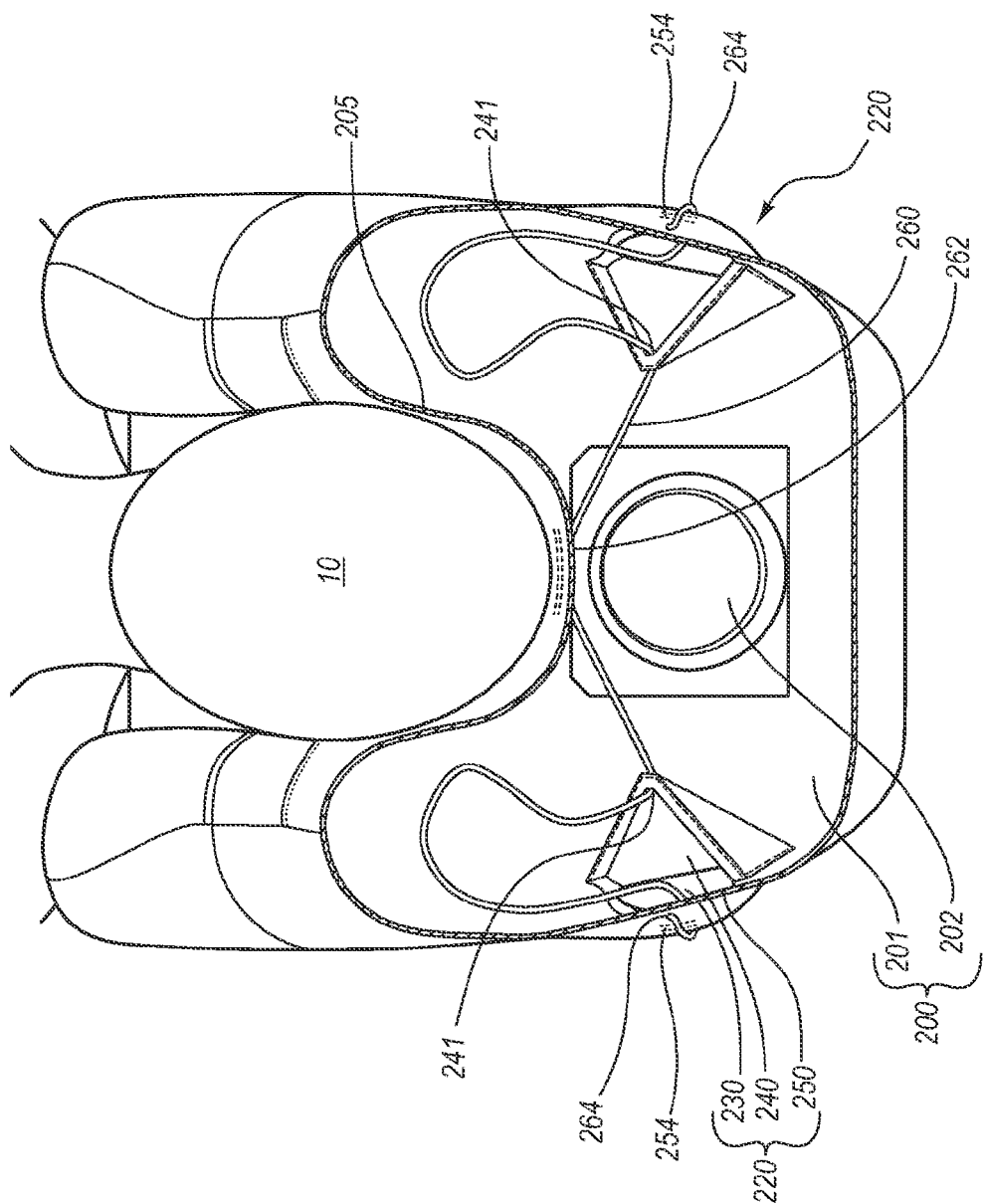
FIG. 4A is a partial cut-away of an airbag cushion that depicts the airbag cushion deployed with an out-of-position occupant adjacent thereto and provides a perspective view of the interior of the airbag cushion. This embodiment has a cord that extends through a cord attachment and connects two opposing vents. The cord extends through a hole in the vent cover of each vent. The cord has ends that are each coupled to a side panel of each vent.
Figure 4B:
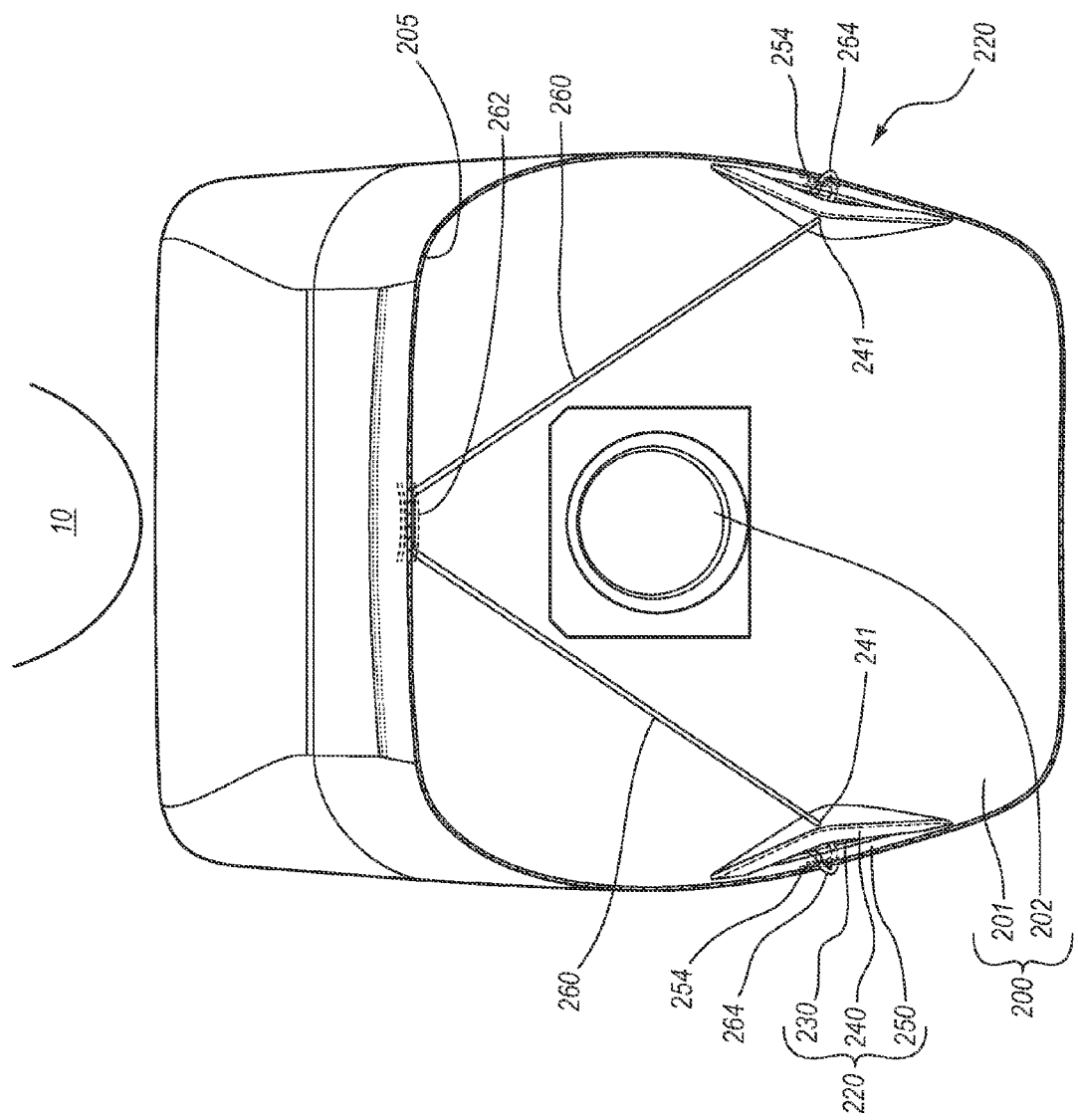
FIG. 4B is a partial cut-away of the embodiment of the airbag cushion shown in FIG. 4A that provides a perspective view of the interior of the airbag cushion.

The embodiment of the airbag module, shown in FIGS. 4A-4B at 200, comprises an airbag cushion 201 and an inflator 202. Opposing vents 220 are positioned at the opposing sides of airbag cushion 201. Each vent 220 comprises a vent opening 230, a vent cover 240 and a side panel 250. A cord 260 is coupled to each side panel 250 at one end. More specifically, the end of cord 260 is attached via stitches 254; however, other suitable coupling components may be utilized to couple the end of the cord to side panel. The other end of each cord 260 is attached to cord attachment 262, which is positioned to move with membrane 205 at the front of airbag cushion 201, namely the front panel. Each cord 260 is moveably positioned in the hole 241 of each vent cover 240. Movement of cord attachment 262 pulls each cord through the respective holes 241 of vent covers 240.

Each paired vent cover 240 and side panel 250 are on opposite sides of the cushion membrane 201. Also, each vent cover and side panel has a side that is at least partially unattached to the cushion membrane, referred to as the unattached side. The respective unattached sides of a paired vent cover 240 and side panel 250 are overlapping so that when they are pulled together they seal vent opening 230 closed.

The airbag cushion 201 is shown in FIG. 4A in approximately the same stage of inflation as in FIG. 3A. However, in FIG. 4A an occupant is out of position in the adjacent seat. Due to the presence of the out-of-position occupant, outward expansion of the airbag body 210 is impeded at the stage of inflation shown in FIG. 4A by the occupant's head, identified at 10, and airbag body 210 laterally expands. Because the airbag body 210 is not able to fully expand, cords 260 remain slack and vent covers 240 remain distended away from vent openings 230 such that vents 220 remain open. Also, side panels 250 are not pulled toward vent covers 240. Because cords 260 permit vent covers 240 to remain pulled away from side panels 250, the inflation gas is easily dumped. A substantial amount of the inflation gas therefore rapidly escapes the airbag body via the cushion vents 220. In this manner, the airbag never fully inflates and the out-of-position occupant is subjected to a smaller inflation force.

FIG. 4B shows module 200 following complete deployment of the airbag cushion with an occupant who was properly positioned adjacent to the system at the time of deployment. Cords 260 have been pulled through holes 241 of each vent cover 240 allowing the respective vent cover 240 to be self sealing with respect to the corresponding vent opening 230. Also, cords 260 have pulled side panel 250 toward the paired vent cover 240 to ensure sealing. Pulling side panel 250 toward vent cover 240 accelerates the closure of the vent because side panel 250 is pulled inward against vent cover 240. Note that cord attachment 262 is stitching that attaches cords 260 to cushion membrane 205.

In an alternative embodiment, cord 260 is replaced with a cord that lacks a stop and is not attached at its ends to the vent cover or the side panel. This embodiment features a cord that extends through a vent cover merely to distend the vent cover away from the vent opening. Once the cord is pulled through the vent cover, then the vent cover closes in the same manner as the embodiments discussed above with regard to FIGS. 1A-3C.

Holes 241 are an example of a friction interface. The friction interface ensures that vent cover 240 remains distended until the cord 260 is pulled with sufficient force to overcome the frictional resistance of the friction interface. The frictional resistance can be varied by selecting the diameter of cord 260 and the diameter of the rim of holes 241. Also, the shape of the rim of holes 241 can be selected to provide a desired amount of frictional resistance. Also, the materials or coatings selected for cord 260 and the rim of holes 241 can also be selected to provide a desired amount of frictional resistance.

Figure 5A:
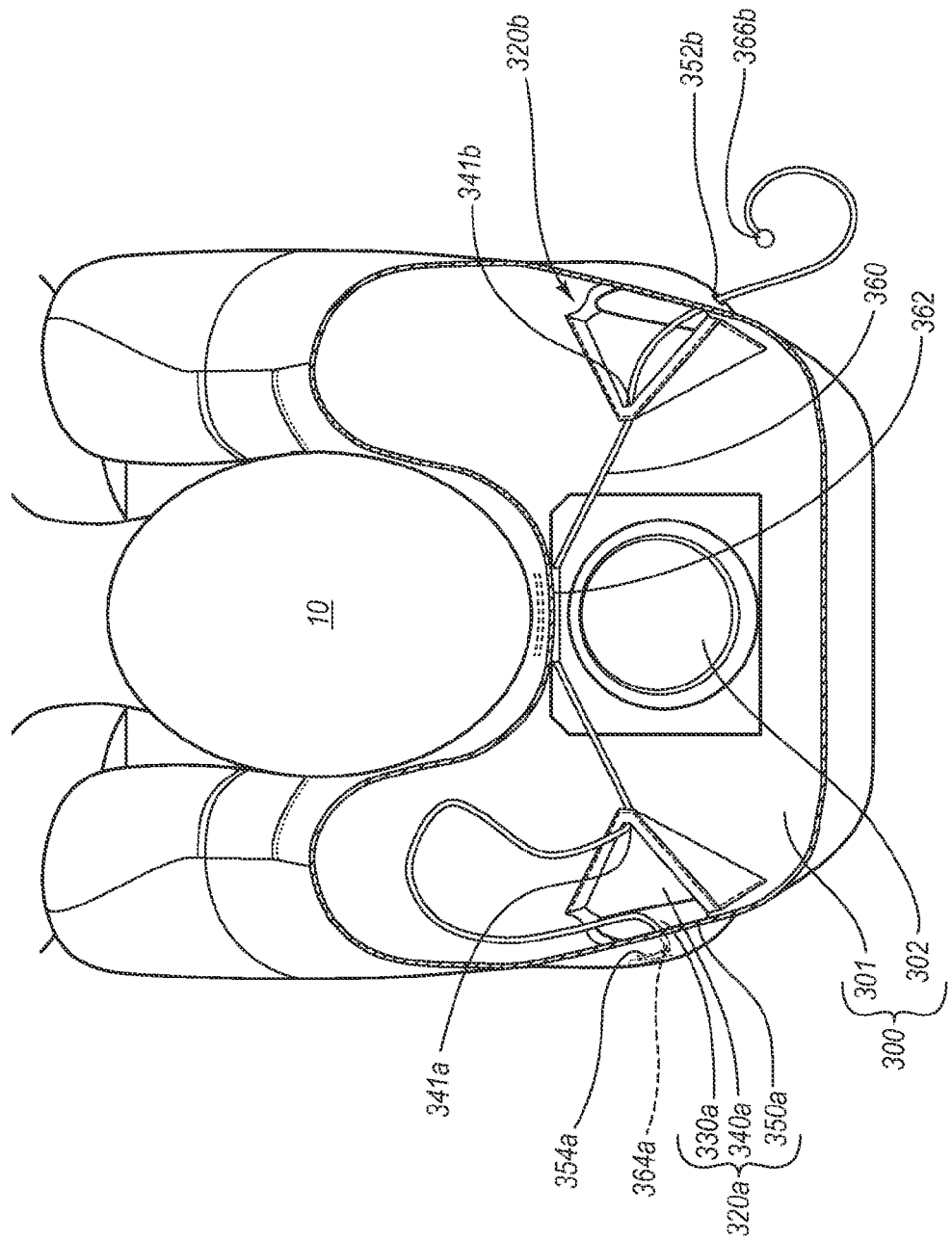
FIG. 5A is a partial cut-away of an airbag cushion that depicts the airbag cushion deployed with an out-of-position occupant adjacent thereto and provides a perspective view of the interior of the airbag cushion. This embodiment has a cord that extends through a cord attachment so that the cord can move laterally within the cord attachment. The cord connects two opposing vents. The cord extends through a hole in the vent cover of each vent. One end of the cord is attached to a side panel of the first vent while the other end is positioned beyond a side panel of the second vent and terminates at a stop.
Figure 5B:
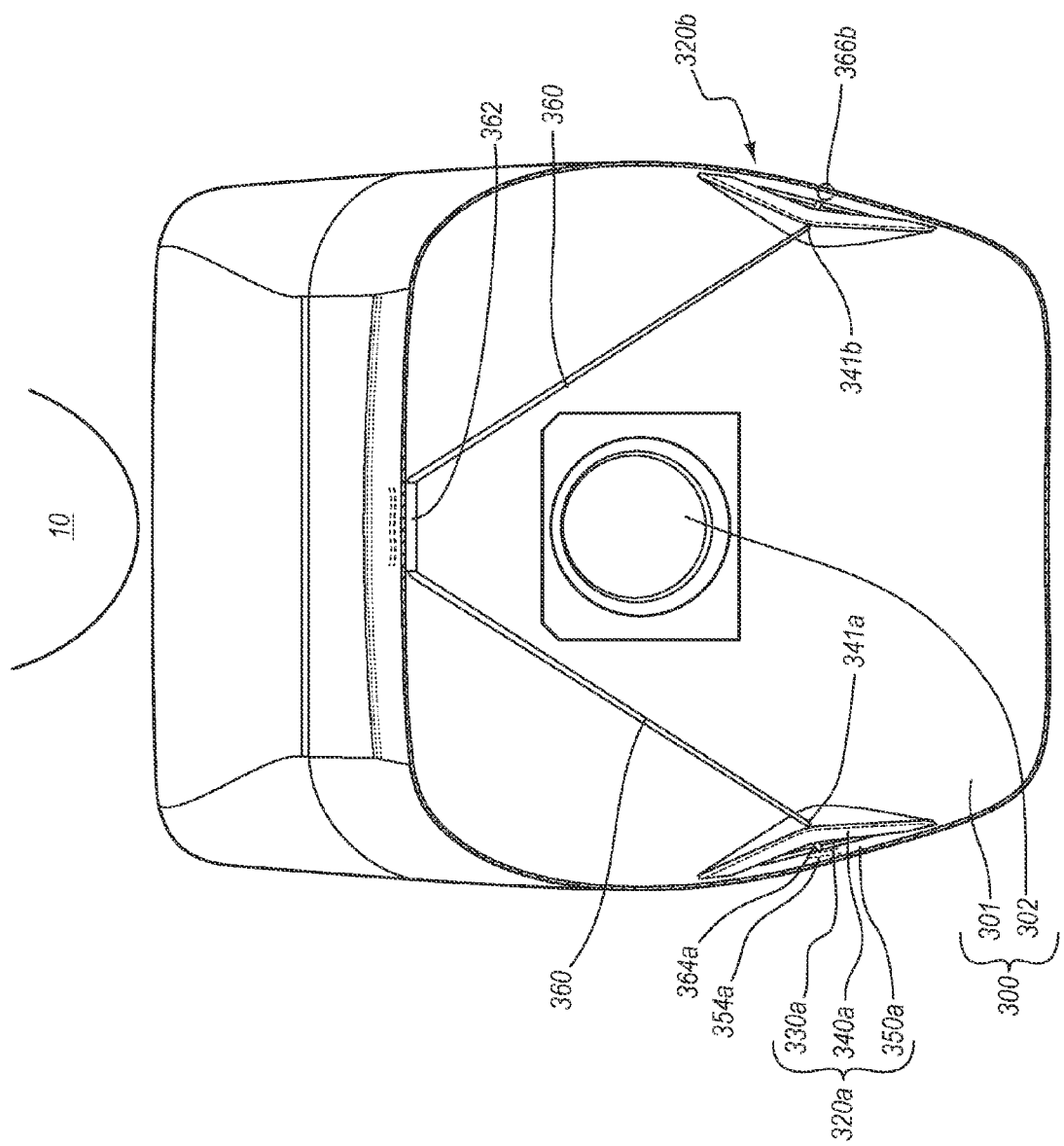
FIG. 5B depicts the embodiment shown in FIG. 5A with the airbag cushion deployed with an occupant that is not out-of-position.

FIGS. 5A-5B depict an embodiment of an airbag cushion at 301 with some similarities to airbag cushion 201. Instead of two cords, airbag cushion 301 has a single cord 360. Cord 360 is positioned to maintain opposing vents 320*a-b* in the open position after inflation and encountering opposition from an occupant who is out of position in the adjacent seat. Cord 360 is shown in FIG. 5A with slack between vent cover 340a and side panel 350a such that vent 320a is open. There is less slack between vent cover 340b and side panel 350b yet it is sufficient to maintain vent 320b in an open position. Cord 360 moves through cord attachment 362, which is a sleeve. Cord 360 is attached at end 364a via stitches 354a to side panel 350a. At the other end of cord 360, stop 366b is configured to engage a hole 352b in side panel 350b.

FIG. 5B shows airbag cushion 301 following its complete deployment with an occupant who was properly positioned adjacent to the system at the time of deployment. The segment of cord 360 extending beyond hole 352b, has been pulled through hole 352b until stop 366b engages the rim of hole 352b. Also, cord 360 has been pulled through holes 341a-b of each respective vent cover 340a-b allowing the respective vent cover 340a-b to be self sealing with respect to the corresponding vent opening 330. The tension caused by attachment of end 364a to side panel 350a and engagement of stop 366b with side panel 350b allows cord 360 to pull each side panel 350a-b toward the paired vent cover 340a-b to ensure sealing.

The embodiments shown in FIGS. 4A-4B and FIGS. 5A-5B, each have a cord that extends through a hole in the vent cover and each cord has an end that engages a side panel to pull the side panel to the vent cover. In the embodiments, as depicted, the cord is coupled to the front of the airbag cushion. In these depicted embodiments, the cord is positioned to initially maintain the vent in an open position by distending the vent cover away from the vent opening and to continue maintaining the vent in the open position upon deployment of the inflatable airbag cushion with obstruction by continuing to distend the vent cover away from the vent opening. Additionally, the cord is positioned to transition the vent to a closed position upon deployment of the inflatable airbag cushion without obstruction by drawing the cord taut due to full inflation of the inflatable airbag cushion. The full inflation draws the side panel to the vent cover and permits the vent cover to move due to cushion membrane tension and cover the vent opening to block the exit of inflation gas out of the vent opening.

The embodiments shown in FIGS. 4A-4B and FIGS. 5A-5B, may also have at least one cord that is sufficiently slack that it has a segment extending between the vent cover and the side panel with a length that is greater than the distance between the side panel and the vent cover when the vent cover is distended away from the vent opening. Such a segment is referred to herein as a slack segment or a loop. There may alternatively be a slack segment between the vent cover and the cord attachment. The slack segment may also extend beyond the airbag cushion such as the segment shown in FIG. 5A that terminates at stop 366b.

The cord attachment may be threads that fixedly attach the cord to the cushion membrane. Additionally, the cord attachment may be a socket that receives the cord. The cord attachment may also be a sleeve that permits the cord to move laterally within the sleeve and adjust to differing tension from each side of the airbag cushion. As discussed above, with reference to the embodiments depicted in FIGS. 4A-4B and FIGS. 5A-5B, the end of the cord that engages the side panel may be sewn to the side panel. Also, as discussed with respect to FIG. 5B, the end of the cord that engages the side panel may have a stop such as stop 366b that pulls side panel 350b.

Holes 341a-b and cord 360 are an example of a friction interface. Hole 352b may also be designed to provide frictional resistance to movement of cord 360. If hole 352b provides more frictional resistance to cord 360 than occurs by designing the engagement to provide for easy sliding, it may be necessary to ensure that the combined frictional resistance of hole 341b and hole 352b with cord 360 equal the frictional resistance of cord 260 with hole 341a.

Figure 6B:
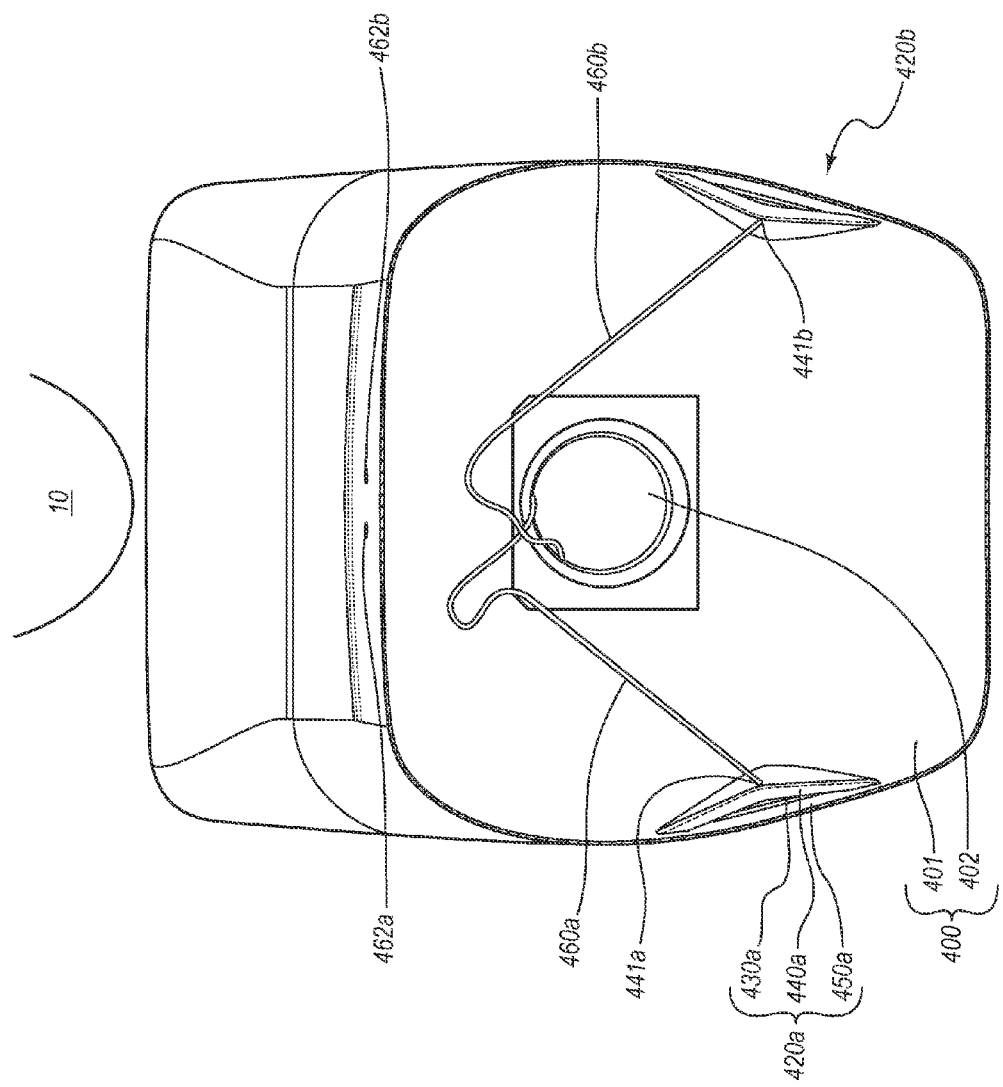
FIG. 6B depicts the embodiment shown in FIG. 6A with the airbag cushion deployed with an occupant that is not out-of-position.

FIGS. 6A-6B depict an embodiment of an airbag cushion at 401 with some similarities to airbag cushion 201. Two cords 460a-b are respectively coupled to vent covers 440a-b at attachments 441a-b. More specifically, cords 460a-b are attached to vent covers 440a-b and attachments 441a-b are stitches. Cords 460a-b also each respectively extend through holes 462a-b. Cords 460a-b are initially pulled such that opposing vent covers 440a-b are distended so that vents 420a-b are in the open position. Segments of cords 460a-b extend outside of airbag cushion 401 via holes 462a-b. After inflation and encountering opposition from an occupant who is out of position in the adjacent seat, segments of cords 460a-b remain outside of airbag cushion 401 as shown in FIG. 6A.

FIG. 6B shows airbag cushion 401 following its complete deployment with an occupant who was properly positioned adjacent to the system at the time of deployment. The segments of cords 460a-b, extending respectively beyond holes 462a-b, have been pulled into the interior of airbag cushion 401. Cords 460a-b are not attached to side panels 450a-b. The pressure of the inflation gas against vent covers 440a-b pushes vent covers 440a-b against side panels 450a-b, thereby allowing vents 420a-b to be self sealing.

Figure 7A:
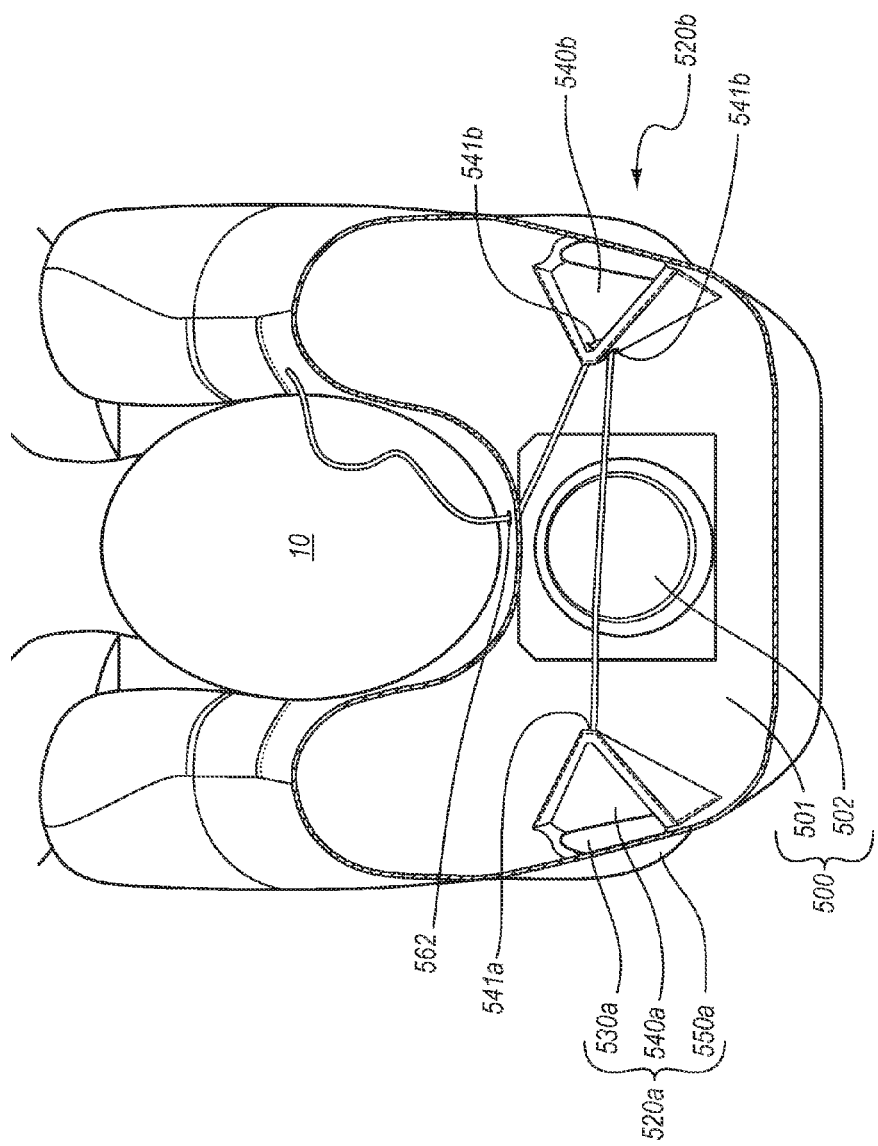
FIG. 7A is a partial cut-away of an airbag cushion that depicts the airbag cushion deployed with an out-of-position occupant adjacent thereto and provides a perspective view of the interior of the airbag cushion. This embodiment has a cord that is coupled to (more specifically, attached to) a vent cover of a first vent and is coupled to ((more specifically, extends through holes in) a vent cover of a second vent. The cord also extends through a hole in the cushion membrane such that a segment of the cord extends out of the cushion membrane.

FIGS. 7A-7B depict an embodiment of an airbag cushion at 501 with some similarities to airbag cushion 401. Cord 560 has an end attached to attachment 541a of vent cover 540a. Vent cover 540b has at least one hole and in the depicted embodiment, vent cover 540b has two holes as identified at 541b. Cord 560 is initially pulled to be taut such that opposing vent covers 540a-b are distended such that vents 520a-b are in the open position. A segment of cord 560 extends outside of airbag cushion 501 via hole 562. After inflation and encountering opposition from an occupant who is out of position in the adjacent seat, the segment of cord 560 that was initially outside of airbag cushion 501 remains outside as shown in FIG. 7A and cord 560 remains sufficiently taut to maintain vents 520a-b in an open position.

FIG. 7B shows airbag cushion 501 following its complete deployment with an occupant who was properly positioned adjacent to the system at the time of deployment. The segment of cord 560 extending beyond hole 562 has been pulled into the interior of airbag cushion 501. Cord 560 may remain in holes 541b of vent cover 540b. Cord 560 is not attached to side panels 550a-b. The pressure of the inflation gas against vent covers 540a-b pushes vent covers 540a-b against side panels 550a-b, thereby allowing vents 520a-b to be self sealing.

Figure 7C:
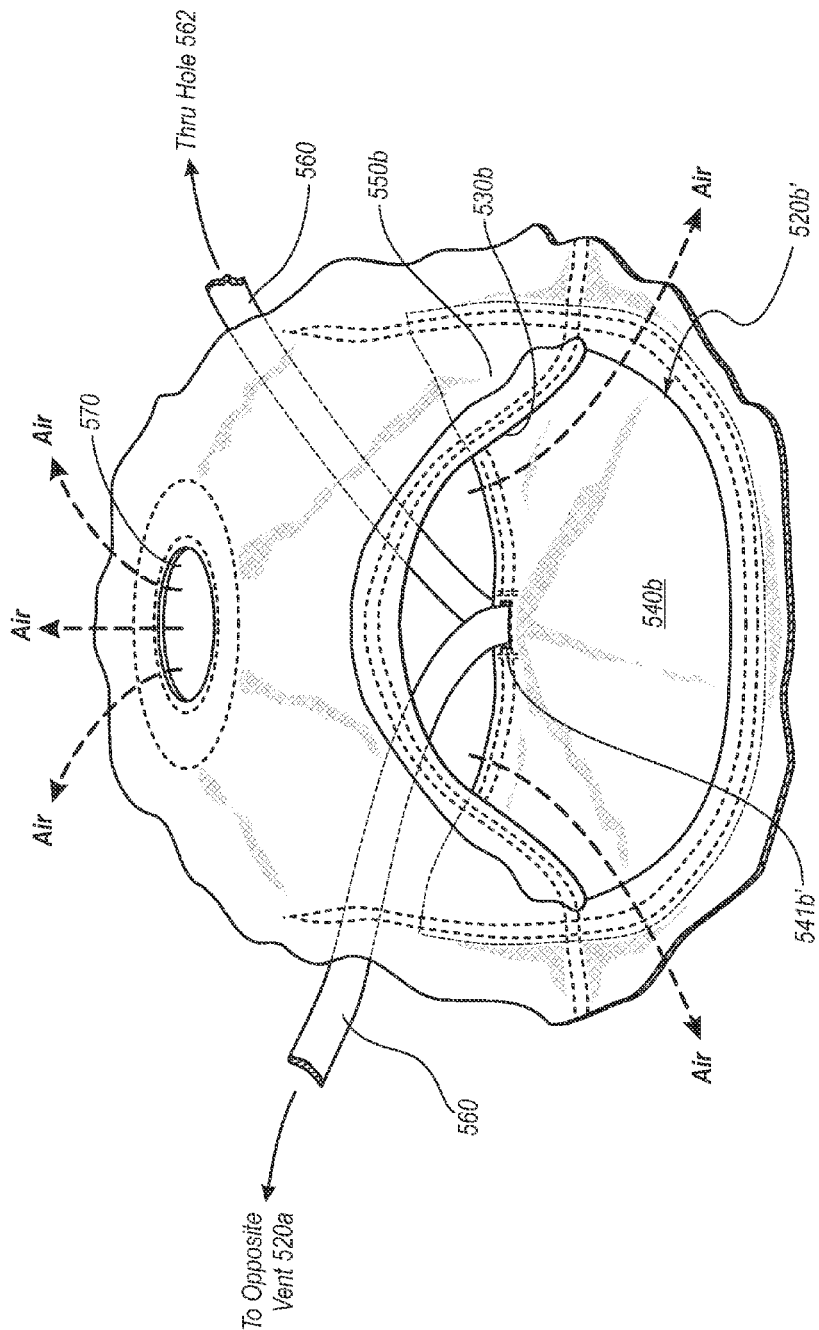
FIG. 7C is an enlarged side view of a vent in the open position that is very similar to the vent shown in FIG. 7A.
Figure 7D:
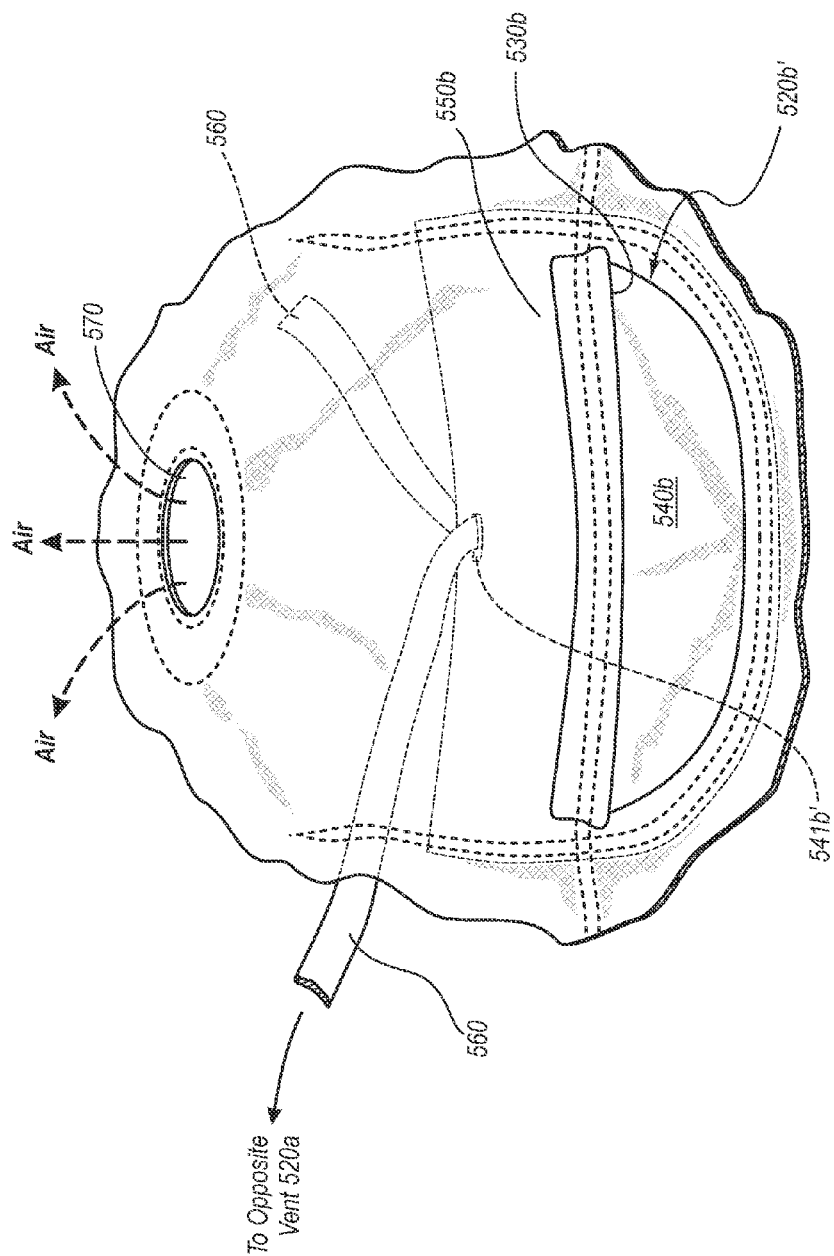
FIG. 7D is an enlarged side view of a vent in the closed position that is very similar to the vent shown in FIG. 7B.

FIGS. 7C-7D are enlarged side views of a vent 520b' that is very similar to vent 520b; however, vent 520b' only has a single hole 541b'. FIG. 7D shows vent 520b' in the closed position while FIG. 7C shows vent 520b' in the open position. These view shows side panel 550b abutting vent cover 540b. Side panel 550b is formed by cutting a slit in cushion membrane 505 with comparatively short sides such that there is a flap of material, folding the flap of material over and then sewing the folded flap to provide reinforcement. Vent cover 540b is attached to the interior surface 505i of cushion membrane 505 below the slit formed in cushion membrane 505 and along the sides. While vent opening 530b is closed, it is defined by the reinforced edge of side panel 550b and vent cover 540b.

The embodiments shown in FIGS. 6A-6B and FIGS. 7A-7D, each have a cord that extends through a hole in the cushion membrane at the front of the airbag cushion such that a segment of the cord that terminates at an end is positioned outside of the airbag cushion before deployment of the airbag cushion. The cord is positioned to initially maintain the vent in an open position by distending the vent cover away from the vent opening and to continue maintaining the vent in the open position upon deployment of the inflatable airbag cushion with obstruction by continuing to distend the vent cover away from the vent opening. Additionally, the cord is also positioned to transition the vent to a closed position upon deployment of the inflatable airbag cushion without obstruction due to full inflation of the inflatable airbag cushion. The full inflation pulls the cord through the hole such that the vent cover can move due to cushion membrane tension and cover the vent opening to block the exit of inflation gas out of the vent opening.

Each vent in the embodiments shown in FIGS. 6A-6B and FIGS. 7A-7D may further comprise a side panel that is adjacent to the vent opening and is positioned to cooperate with the vent cover to block the exit of inflation gas out of the vent opening. In the depicted embodiments, the cord is not coupled to the side panel; however, the cord may optionally extend from the side panel instead of the vent cover.

Holes 462*a-b* can also be designed to provide a friction interface respectively with cords 460*a-b*. If holes 462*a-b* provides more frictional resistance to cord 460 than occurs by designing the engagement to provide for easy sliding, the frictional resistance of each cord and each hole should be about equal for symmetrical movement of the vents. Hole 562 and cord 560 may be designed such that they have more frictional resistance to movement of cord 560 than occurs between cord 560 and holes 541*b*, which merely permits cord 560 to easily slide in holes 541*b*. Alternatively, there may be greater frictional resistance between cord 560 and holes 541*b* than with hole 562.

FIGS. 8A-8J depict a method for folding cushion 501 that results in a frictional retention of cord 560 to maintain cord 560 in the position desired to keep the vents open until inflation of the airbag cushion occurs without obstruction from an occupant. The frictional retention of cord achieved through folds and/or rolls provides a similar function to the frictional interface described above with respect to the cord and various holes, which retains the distended configuration of the vent cover to maintain the vent in the open position.

Figure 8C:
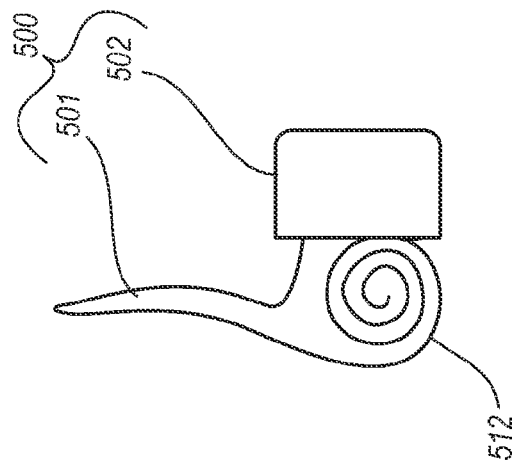
FIG. 8C is a side view of the airbag module shown in FIGS. 8A-8B with the folded half of the airbag cushion after it has been rolled.
Figure 8B:
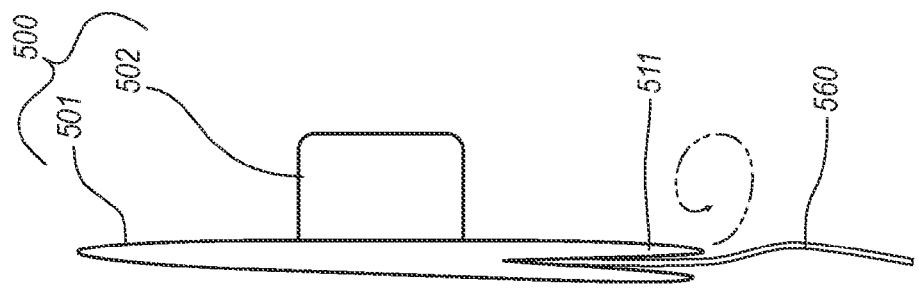
FIG. 8B is a side view of the fold shown in FIG. 8A.
Figure 8A:
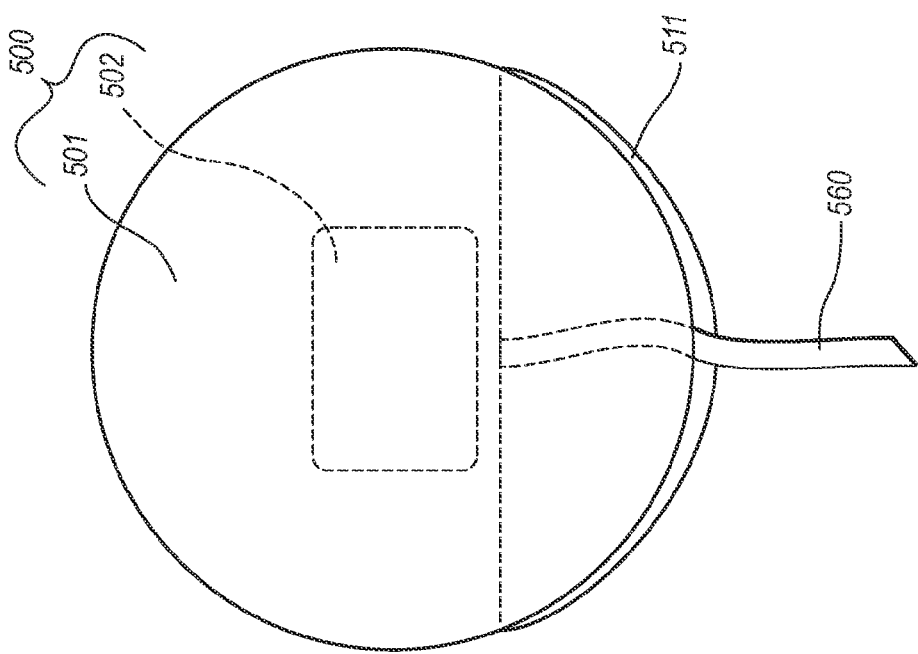
FIG. 8A is a top plan view of the airbag cushion with a fold or depression at the location where the cord extends out of a hole in the cushion membrane.

FIG. 8A shows half of airbag cushion 501 with a fold 511 at the location where cord 560 extends out of hole 562. A portion of the segment of cord 560 that extends out of hole 562 is positioned within fold 511 while a segment continues to extend beyond fold 511. FIG. 8B is the side view of the folding step shown in FIG. 8A. FIG. 8C shows the folded half of airbag cushion 501 after it has been rolled to provide rolled portion 512. The rolling contributes to retention of the vents in the open position as the rolled fold must be unrolled before cord 560 can be pulled through hole 562.

FIGS. 8D-8J show the remaining folding steps. In FIG. 8D, shows the right side 513*b* of airbag cushion 501 before it is folded as shown in FIG. 8E. FIG. 8E shows right side 513*b* being folded again to yield folded portion 514*b*. The same steps shown in FIGS. 8D-8E are paralleled on the other side as shown in FIGS. 8F-8G, which show left side 513*a* being folded to yield folded portion 514*a*. Folded portions 514*a-b* can then be further folded as shown in FIG. 8H at fold 515 as shown in FIG. 8I. Finally, the overhanging portion 516 is folded as shown in FIG. 8J.

After completion of the steps shown in FIGS. 8A-8J and before deployment, airbag cushion 501 comprises folds and rolls such that airbag cushion 501 has a compact configuration. Also, the segment of cord 560 extending out of the hole in the cushion membrane, as best seen in FIG. 8A, is in a rolled portion 512 of airbag cushion 501 that has also been folded, which results in a frictional retention of cord 560 to initially maintain vent 520 in an open position, and to resist transitioning the vent to the closed position until deployment of the inflatable airbag cushion without obstruction.

Many design variations are possible and should be considered within the scope of the invention. Accordingly, the design could be tailored to adjust or fine tune the deployment and deployment forces in accordance with various occupant positions. The design could be tailored, for instance, to allow a small number of cushion vents to remain open in the event that an occupant is only slightly out of position, allow a greater number of cushion vents to remain open in the event that an occupant is further out of position, and allow most or all cushion vents to remain open in the event that an occupant is positioned very close to the airbag at the time of deployment. The design could also be tailored to account for a passenger being out of position laterally with respect to the airbag by configuring the release cords to allow primarily the cushion vents on one side of the airbag cushion body or the other to remain open in accordance with the position of the out-of-position occupant. The length of cords may also differ in accordance with design specifications of the airbag cushion body.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. The claims that follow are hereby expressly incorporated into the present written disclosure, with each claim standing on its own as a separate embodiment. Moreover, additional embodiments capable of derivation from each set of independent and dependent claims are also expressly incorporated into the present written description. These additional embodiments are determined by replacing the dependency of a given dependent claim with the phrase "any of the preceding claims up to and including the nearest independent claim." For example, for the claim set that begins with independent claim 1, claim 3 can depend from either of claims 1 and 2, with these separate dependencies yielding two distinct embodiments; claim 4 can depend from any one of claims 1, 2, or 3, with these separate dependencies yielding three distinct embodiments; claim 5 can depend from any one of claims 1, 2, 3, or 4, with these separate dependencies yielding four distinct embodiments; and so on.

Recitation in the claims of the term "first" with respect to a feature or element does not necessarily imply the existence of a second or additional such feature or element. Elements recited in means-plus-function format are intended to be construed in accordance with 35 U.S.C. §112 ¶6.

It will be understood by those having skill in the art that many changes may be made to the details of the above-described embodiments without departing from the underly-

The invention claimed is:

1. An airbag module, comprising:
   an inflatable airbag cushion comprising a cushion membrane which defines an interior of the inflatable airbag cushion, wherein the cushion has a front;
   a closeable vent comprising a vent opening in the cushion membrane and a vent cover that extends over the vent opening; and
   a cord that engages the vent cover, wherein the cord extends through a hole in the cushion membrane at the front of the airbag cushion such that a segment of the cord that terminates at an end is positioned outside of the airbag cushion before deployment of the airbag cushion;
   wherein the cord is positioned to initially maintain the vent in an open position by distending the vent cover away from the vent opening, to continue maintaining the vent in the open position upon deployment of the inflatable airbag cushion with obstruction by continuing to distend the vent cover away from the vent opening, and to transition the vent to a closed position upon deployment of the inflatable airbag cushion without obstruction due to full inflation of the inflatable airbag cushion, which pulls the cord through the hole such that the vent cover can move due to cushion membrane tension and cover the vent opening to block the exit of inflation gas out of the vent opening.

2. The airbag module of claim 1, wherein, before deployment, the airbag cushion comprises folds and rolls such that the airbag cushion has a compact configuration, wherein the segment of the cord extending out of the hole in the cushion membrane is in a rolled portion of the airbag cushion that has also been folded, which results in a frictional retention of the cord to initially maintain the vent in an open position, and to resist transitioning the vent to the closed position until deployment of the inflatable airbag cushion without obstruction.

3. The airbag module of claim 1, wherein the vent further comprises a side panel that is adjacent to the vent opening and is positioned to cooperate with the vent cover to block the exit of inflation gas out of the vent opening.

4. The airbag module of claim 3, wherein the side panel is not coupled to the cord.

5. The airbag module of claim 1, further comprising an additional closeable vent and an additional cord,
   wherein the additional closeable vent is positioned at one of the opposing sides of the cushion opposite from the closeable vent, wherein the additional closeable vent comprises a vent opening in the cushion membrane and a vent cover that extends over the vent opening;
   wherein the additional cord is attached to the vent cover of the additional closeable vent and extends out of an additional hole in the cushion membrane; and
   wherein the additional cord is positioned to initially maintain the additional closeable vent in an open position by distending the vent cover of the additional closeable vent away from the vent opening, to continue maintaining the additional closeable vent in the open position upon deployment of the inflatable airbag cushion with obstruction by continuing to distend the vent cover of the additional closeable vent away from the vent opening of the additional closeable vent, and to transition the additional closeable vent to a closed position upon deployment of the inflatable airbag cushion without obstruction due to full inflation of the inflatable airbag cushion, which pulls the additional cord in the additional hole in the cushion membrane such that the vent cover of the additional closeable vent can move due to cushion membrane tension and cover the vent opening of the additional closeable vent to block the exit of inflation gas out of the vent opening of the additional closeable vent.

6. The airbag module of claim 1, further comprising an additional closeable vent positioned at one of the opposing sides of the cushion opposite from the closeable vent, wherein the additional closeable vent comprises a vent opening in the cushion membrane and a vent cover that extends over the vent opening;
   wherein the cord extends from the vent cover of the closeable vent, through at least one hole in the vent cover of the additional closeable vent and out of the hole in the cushion membrane; and
   wherein the cord is positioned to initially maintain the additional closeable vent in an open position by distending the vent cover of the additional closeable vent away from the vent opening, to continue maintaining the additional closeable vent in the open position upon deployment of the inflatable airbag cushion with obstruction by continuing to distend the vent cover of the additional closeable vent away from the vent opening of the additional closeable vent, and to transition the additional closeable vent to a closed position upon deployment of the inflatable airbag cushion without obstruction due to full inflation of the inflatable airbag cushion, which pulls the cord in the hole in the cushion membrane and in the hole of the vent cover of the additional closeable vent such that the vent cover of the additional closeable vent can move due to cushion membrane tension and cover the vent opening of the additional closeable vent to block the exit of inflation gas out of the vent opening of the additional closeable vent.

7. The airbag module of claim 1, wherein the segment of the cord that terminates at an end and is positioned outside of the airbag cushion before deployment of the airbag cushion, is pulled through the hole in the cushion membrane and into the inflatable airbag cushion upon deployment of the inflatable airbag cushion without obstruction.

* * * * *